(12) United States Patent
Iwai et al.

(10) Patent No.: US 9,470,174 B2
(45) Date of Patent: Oct. 18, 2016

(54) CONTROL SYSTEM AND CONTROL METHOD OF SPARK IGNITION GASOLINE ENGINE

(71) Applicant: MAZDA MOTOR CORPORATION, Hiroshima (JP)

(72) Inventors: Kouhei Iwai, Hiroshima (JP); Masahisa Yamakawa, Hiroshima (JP); Takashi Youso, Hiroshima (JP); Tatsuya Fujikawa, Aki-gun (JP); Tatsuya Koga, Higashi-Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 117 days.

(21) Appl. No.: 14/346,947

(22) PCT Filed: Nov. 8, 2012

(86) PCT No.: PCT/JP2012/007190
§ 371 (c)(1),
(2) Date: Mar. 24, 2014

(87) PCT Pub. No.: WO2013/080454
PCT Pub. Date: Jun. 6, 2013

(65) Prior Publication Data
US 2014/0299107 A1 Oct. 9, 2014

(30) Foreign Application Priority Data
Nov. 28, 2011 (JP) .................................. 2011-258492

(51) Int. Cl.
| F02D 41/40 | (2006.01) |
|---|---|
| F02D 41/00 | (2006.01) |
| F02D 41/30 | (2006.01) |
| F02D 41/32 | (2006.01) |

(52) U.S. Cl.
CPC ........... *F02D 41/401* (2013.01); *F02D 41/006* (2013.01); *F02D 41/0065* (2013.01);
(Continued)

(58) Field of Classification Search
CPC ...... F02D 1/162; F02D 41/34; F02D 41/345; F02D 41/40; F02D 41/401; F02D 2001/165; F02D 2200/101; F02D 2200/1006
USPC .................................. 123/295; 701/103, 105
See application file for complete search history.

(56) References Cited

U.S. PATENT DOCUMENTS

| 7,784,443 B2 * | 8/2010 | Hitomi ................ F02D 13/0223 123/316 |
| 8,655,572 B2 * | 2/2014 | Iwai .................... F02D 41/0057 123/295 |

(Continued)

FOREIGN PATENT DOCUMENTS

| JP | 2007-154859 A | 6/2007 |
| JP | 2007-292050 A | 11/2007 |

(Continued)

OTHER PUBLICATIONS

International Search Report; PCT/JP2012/007190; Feb. 12, 2013.

*Primary Examiner* — Lindsay Low
*Assistant Examiner* — Robert Werner
(74) *Attorney, Agent, or Firm* — Studebaker & Brackett PC

(57) ABSTRACT

An engine body includes a cylinder with a geometrical compression ratio of 15 or higher, and is supplied with fuel containing at least gasoline. When an operating mode of the engine body is in a high load range, a controller (i.e., a PCM 10) drives a fuel injection valve (i.e., an injector) 67 to inject the fuel at a time within a retarded period between a terminal stage of a compression stroke and an initial stage of an expansion stroke in a low speed range. The controller drives the fuel injection valve to inject the fuel in an intake stroke until an intake valve 21 is closed in a high-load high-speed range.

9 Claims, 13 Drawing Sheets

(52) U.S. Cl.
CPC ....... *F02D41/3029* (2013.01); *F02D 41/3035* (2013.01); *F02D 41/3064* (2013.01); *F02D 41/32* (2013.01); *Y02T 10/44* (2013.01); *Y02T 10/47* (2013.01)

(56) References Cited

U.S. PATENT DOCUMENTS 8,985,086 B2 * 3/2015 Shishime ............ F02D 41/405
                                                          123/299

| | | | |
|---|---|---|---|
| 2007/0227503 | A1 | 10/2007 | Hitomi et al. |
| 2009/0159045 | A1 | 6/2009 | Hitomi et al. |
| 2012/0216775 | A1 | 8/2012 | Iwai et al. |

FOREIGN PATENT DOCUMENTS

| | | |
|---|---|---|
| JP | 2007-292065 A | 11/2007 |
| JP | 2009-091994 A | 4/2009 |
| JP | 2010-084618 A | 4/2010 |
| JP | 2012-172662 A | 9/2012 |

\* cited by examiner (a)

(b)

US 9,470,174 B2

CONTROL SYSTEM AND CONTROL METHOD OF SPARK IGNITION GASOLINE ENGINE

TECHNICAL FIELD

The present disclosure relates to control systems and control methods of spark ignition gasoline engines.

BACKGROUND ART

In order to improve the theoretical thermal efficiency of a spark ignition gasoline engine, increasing the geometrical compression ratio of the engine is effective. For example, Patent Document 1 teaches a high compression spark-ignition direct-injection engine with a geometrical compression ratio of 14 or higher.

For example, as shown in Patent Document 2, the combustion of compressing and igniting a lean air-fuel mixture is known as a technique improving both of the exhaust emission and the thermal efficiency. In an engine performing the compression ignition combustion, increasing the geometrical compression ratio improves both of the compression end pressure and the compression end temperature, and is thus advantageous in stabilizing the compression ignition combustion.

Patent Document 3 teaches performing EGR and enriching the air-fuel ratio in accordance with the operating mode of an engine in transition from compression ignition combustion to spark ignition combustion, thereby reducing knocking.

CITATION LIST

Patent Document

PATENT DOCUMENT 1: Japanese Patent Publication No. 2007-292050
PATENT DOCUMENT 2: Japanese Patent Publication No. 2007-154859
PATENT DOCUMENT 3: Japanese Patent Publication No. 2009-91994

SUMMARY OF THE INVENTION

Technical Problem

The spark ignition gasoline engine with the high compression ratio as shown in Patent Document 1 is advantageous in improving the thermal efficiency. The engine is however subject to abnormal combustion such as preignition and knocking (i.e., end gas knock) particularly when the operating mode of the engine is in a low-speed, middle and high-load range.

Engines perform compression ignition combustion in a low load operation range. However, with an increase in the load of the engines, preignition combustion occurs to dramatically increase the pressure. This increases combustion noise, causes abnormal combustion, and increases Raw NOx caused by a high combustion temperature. As shown in Patent Documents 2 and 3, even the engines performing the compression ignition combustion do not usually perform the compression ignition combustion but spark ignition combustion by driving a spark plug in a high load operation range. However, engines with a high geometrical compression ratio to stabilize the compression ignition combustion cause abnormal combustion in the high load operation range performing the spark ignition combustion, similar to the engine shown in Patent Document 1.

The present disclosure addresses the problem. It is an objective of the present disclosure to reduce abnormal combustion in a high load range in a spark ignition gasoline engine with a relatively high geometrical compression ratio of, for example, 15 or higher.

Solution to the Problem

Abnormal combustion such as preignition and knocking is auto-ignition reaction in accordance with compression of an unburnt part of an air-fuel mixture in a cylinder in a compression stroke, and auto-ignition reaction in accordance with compression of the unburnt part of the air-fuel mixture caused by expansion of the burnt part of the air-fuel mixture in the combustion of the air-fuel mixture. As one cause, such abnormal combustion in conventional engines injecting fuel in an intake stroke is attributed to a long reactive time of the unburnt mixture, which is the period between the start of the fuel injection to the end of the combustion. The present inventors focus on retarding the time of the fuel injection near the compression top dead center in view of reducing the reactive time of the unburnt mixture.

As such, retarding the time of the fuel injection is effective in reducing abnormal combustion in a low speed range of engines requiring a long actual time for changing crank angles.

However, since the actual time for changing the crank angles is short in a high speed range of the engines, retarding the time of the fuel injection is less advantageous in reducing the reactive time of the unburnt mixture.

On the contrary, retarding the time of the fuel injection near the compression top dead center allows air with a high specific heat ratio to be compressed in a cylinder in a compression stroke. This causes the problem of largely increasing the cylinder temperature at the compression top dead center (i.e., the compression end temperature). This is particularly disadvantageous in reducing knocking in a high speed range of an engine.

The present inventors have completed the technique disclosed herein, focusing on performing fuel injection in accordance with the engine speed, i.e., at different times between a low speed range and a high speed range in a high load range where an engine with a high compression ratio is subject to abnormal combustion.

Specifically, the present disclosure provides a control system of a spark ignition gasoline engine. The system includes an engine body including a cylinder with a geometrical compression ratio of 15 or higher, and supplied with fuel containing at least gasoline; a fuel injection valve configured to inject the fuel supplied to the cylinder; and a controller configured to operate the engine body by controlling at least the fuel injection valve.

When an operating mode of the engine body is in a high load range, the controller drives the fuel injection valve to inject the fuel at a time within a retarded period between a terminal stage of a compression stroke and an initial stage of an expansion stroke in a low speed range, and drives the fuel injection valve to inject the fuel in an intake stroke until an intake valve is closed in a high speed range.

The geometrical compression ratio of the engine body may be 15 or higher, for example, 20 or lower.

The "high load range" may be a high load range, where the operation range of the engine body is divided into two of high and low load ranges.

The "low speed range" may be a low speed range, where the operation range of the engine body is divided into two of high and low speed ranges. Alternatively, the "low speed range" may be a low speed range, where the operation range of the engine body is divided into three of low, medium, and high speed ranges. The "high speed range" may be a high speed range, where the operation range of the engine body is divided into two of high and low speed ranges. Alternatively, the "high speed range" may be a high speed range or medium and high speed ranges, where the operation range of the engine body is divided into three of low, medium, and high speed ranges.

The "terminal stage of a compression stroke" may be a terminal stage, where the compression stroke is divided into three of initial, middle, and terminal stages. Similarly, the "initial stage of an expansion stroke" may be an initial stage where the expansion stroke is divided into three of initial, middle, and terminal stages.

The "intake stroke period until an intake valve is closed" is the period defined not based on the position of a piston, but based on the opening or closing of the intake valve. Thus, the initial stage of the intake stroke period may be the same as or different from the time when the piston reaches the intake bottom dead center.

When the operation range of the engine body is in the high-load low-speed range, the pressure and the temperature in the cylinder are higher than those in the low load range. In addition, the actual time to change the crank angle is longer. As a result, the engine body is subject to abnormal combustion such as preignition and knocking. Having the high compression ratio, the engine body configured as above is particularly subject to abnormal combustion when the operation range of the engine body is in the high-load low-speed range.

In this high-load low-speed range, in the control system of the engine configured as above, the controller sets the time of the fuel injection (more precisely, the start of the injection) within the retarded period between the terminal stage of the compression stroke and the initial stage of the expansion stroke. This shortens the reactive time of an unburnt mixture, thereby effectively reducing abnormal combustion such as preignition and knocking.

On the other hand, in the high-load high-speed range, the controller performs fuel injection in the intake stroke until the intake valve is closed. As a result, not the air in the cylinder but the air-fuel mixture, in other words, gas with a relatively low specific heat ratio in the cylinder is compressed in the compression stroke. This reduces a rise in the temperature of the gas in the cylinder to lower the compression end temperature. As a result, the engine is also advantageous in reducing abnormal combustion in the high speed range.

With this configuration, abnormal combustion is reduced in the high load range of the engine using creative fuel injection into the cylinder. There is thus no need to retard ignition time to reduce abnormal combustion, or the amount of retarding the ignition time can be reduced. This advances the ignition time as much as possible. That is, the above-described configuration is advantageous in reducing abnormal combustion and improving the thermal efficiency and the torque, in other words, advantageous in improving the fuel efficiency, in both of the low speed range and the high speed range.

The control system of the spark ignition gasoline engine may further include a plurality of spark plugs disposed to face an inside of the cylinder, and configured to ignite an air-fuel mixture in the cylinder. When the operating mode of the engine body is in the high-load high-speed range, the controller may execute multi-point ignition driving the plurality of spark plugs. The plurality of spark plugs may be ignited at the same time or different times as appropriate.

The multi-point ignition driving the plurality of spark plugs shortens the combustion period between the ignition of the air-fuel mixture and the end of the combustion of the air-fuel mixture. The reduction in the combustion period effectively reduces knocking in the high speed range, and in addition, is advantageous in improving the thermal efficiency and the torque. Single point ignition or multi-point ignition may be performed in the high-load low-speed range.

The control system of the spark ignition gasoline engine may further include the fuel injection valve configured to directly inject the fuel into the cylinder; and a fuel pressure variable mechanism configured to change pressure of the fuel injected by the fuel injection valve. When the operating mode of the engine body is in the high-load low-speed range, the controller drives the fuel pressure variable mechanism such that the pressure of the fuel is equal to or higher than a predetermined value. When the operating mode of the engine body is in the high-load high-speed range, the controller drives the fuel pressure variable mechanism such that the pressure of the fuel is lower than the predetermined value.

The reactive time of the unburnt mixture includes three periods of the injection period during which the fuel injection valve injects the fuel, a mixture formation period between the end of the fuel injection and the formation of a burnable mixture around the spark plugs, and the combustion period between the start of the combustion by igniting the burnable mixture around the spark plugs and the end of the combustion.

Increasing the fuel pressure to be equal to or higher than the predetermined value increases the amount of the fuel injected by the combustion injection valve per unit time. As compared to the case where the same amount of the fuel is injected at a low fuel pressure, the high fuel pressure shortens the period of injecting the fuel into the cylinder, that is, the injection period.

The high fuel pressure is also advantageous in atomizing the fuel spray injected into the cylinder, and in extending the flying distance of the fuel spray. Thus, the high fuel pressure shortens the period (i.e., the mixture formation period) between the end of the fuel injection and the formation of the burnable mixture around the spark plugs. As described above, even if the time of the fuel injection is set within the retarded period which is late near the compression top dead center, shortening the injection period and the mixture formation period enables the formation of the burnable mixture around the spark plugs until the succeeding ignition time.

Injecting the fuel into the cylinder at the high fuel pressure increases gas turbulence in the cylinder, and turbulence energy in the cylinder. The high turbulence energy contributes to shorting of the combustion period together with the setting the time of the fuel injection relatively late.

Assume that the fuel is injected into the cylinder at the high fuel pressure. Even so, if the injection time is within the intake stroke similar to the conventional techniques, the time until the ignition is long, and the inside of the cylinder is compressed in the compression stroke after the intake stroke. As a result, the gas turbulence decreases in the cylinder, and the turbulence energy in the cylinder during the combustion period becomes relatively low. Higher turbulence energy in the cylinder is advantageous in shortening the combustion period. Thus, even if the fuel is injected into the cylinder at the high fuel pressure, it does not largely contribute to shortening of the combustion period as long as the injection time is within the intake stroke.

By contrast, as in the above-described configuration, injecting the fuel into the cylinder at the high fuel pressure in the relatively late time within the retarded period mitigates reduction in the gas turbulence in the cylinder, and allows the combustion to start at an early stage after the fuel injection. Therefore, the turbulence energy in the cylinder increases in the combustion period, thereby shortening the combustion period.

As such, in the high-load low-speed range, the fuel is injected into the cylinder at the high fuel pressure within the retarded period, which is a relatively late time. This shortens the injection period, the mixture formation period, and the combustion period. As a result, the reactive time of the unburnt mixture is largely shortened as compared to the conventional techniques. Therefore, abnormal combustion such as preignition and knocking is efficiently reduced.

The predetermined pressure may be, for example, 40 MPa. Fuel pressure of 40 MPa or higher efficiently shortens all the above-described periods of the injection period, the mixture formation period, and the combustion period. The maximum value of the fuel pressure may be determined in accordance with the characteristics of the fuel. As an example, although not limited thereto, the maximum value of the fuel pressure may be about 120 MPa.

By contrast, in the high-load high-speed range, as described above, the fuel is injected within the intake stroke. Thus, extremely high fuel pressure attaches the fuel to the wall of the cylinder when the fuel is injected into the cylinder, thereby causing problems such as oil delusion. Since the fuel is injected within the intake stroke, there is no need to increase the fuel pressure in view of shortening the injection period and the mixture formation period. Thus, in the high speed range, the pressure of the fuel is lower than the predetermined value. This reduces the above-described problems. In addition, for example, in the configuration where a fuel pump driven by the engine raises the fuel pressure, lowering the fuel pressure reduces the mechanical loss of the engine, and is thus advantageous in improving the fuel efficiency.

When the operating mode of the engine body is in the high-load high-speed range, the controller may execute fuel injection at the time within the retarded period, in addition to the fuel injection in the intake stroke, and may set an amount of the fuel injected in the retarded period smaller than the amount of the fuel injected in the intake stroke.

As described above, the fuel injection within the retarded period increases the flow in the cylinder, which is advantageous in shortening the combustion period. When the operating mode of the engine body is in the high-load high-speed range, a small amount of the fuel may be injected within the retarded period together with the fuel injection in the intake stroke. As a result, a relatively large amount of the fuel is injected in the intake stroke to sufficiently lower the specific heat ratio of the in-cylinder gas compressed in the compression stroke. This reduces a rise in the compression end temperature. In addition, the fuel injection within the retarded period increases the flow in the cylinder to shorten the combustion period. As a result, abnormal combustion is efficiently reduced in the high-load high-speed range.

The controller may execute both of the fuel injection in the intake stroke and the fuel injection in the retarded period under a condition where a compression end temperature in the cylinder is equal to or lower than a predetermined temperature. The "condition where a compression end temperature in the cylinder is equal to or lower than a predetermined temperature" may be the condition where the compression end temperature in motoring the engine body is equal to or lower than the predetermined temperature. Specifically, an example may be the condition where the outside temperature is equal to or lower than the predetermined temperature.

When the compression end temperature is equal to or lower than the predetermined temperature, even a small amount of the fuel injected in the intake stroke reduces abnormal combustion. The amount of the fuel injected in the intake stroke is reduced, and the reduced amount of the fuel is injected in the retarded period. This is advantageous in increasing the gas flow in the cylinder, and eventually advantageous in shortening the combustion period. As a result, abnormal combustion is efficiently reduced in the high-load high-speed range.

The control system of the spark ignition gasoline engine may further include a cooling EGR section configured to cool exhaust gas of the engine body, and then to recirculate the cooled exhaust gas into an intake air of the engine body. When the operating mode of the engine body is in the high-load high-speed range, the controller recirculates the cooled exhaust gas via the cooling EGR section.

Introducing the cooled exhaust gas, that is, low temperature inert gas, into the cylinder is advantageous in reducing a rise in the compression end temperature and reducing abnormal combustion, and as well as in reducing Raw NOx.

The present disclosure provides a control system of a spark ignition gasoline engine. The system includes an engine body including a cylinder with a geometrical compression ratio of 15 or higher, and supplied with fuel containing at least gasoline; a fuel injection valve configured to inject the fuel supplied to the cylinder; and a controller configured to operate the engine body by controlling at least the fuel injection valve. When an operating mode of the engine body is in a high load range, the controller drives the fuel injection valve to include preceding injection injecting the fuel in an intake stroke until an intake valve is closed, and succeeding injection injecting the fuel at a time between a terminal stage of a compression stroke and an initial stage of an expansion stroke, and the controller sets an amount of the fuel injected in the succeeding injection larger than the amount of the fuel injected in the preceding injection in a low speed range of the high load range, and sets the amount of the fuel injected in the preceding injection larger than the amount of the fuel injected in the succeeding injection in a high speed range of the high load range.

Similar to the above-described aspect, when the operating mode of the engine body is in the high-load low-speed range, the controller relatively increases the amount of the fuel injected in the succeeding injection which injects the fuel at the time between the terminal stage of the compression stroke and the initial stage of the expansion stroke. This shortens the reactive time of the unburnt mixture. This is thus advantageous in reducing abnormal combustion such as preignition and knocking in a high compression engine with a high geometrical compression ratio.

On the other hand, when the operating mode of the engine body is in the high-load high-speed range, the controller relatively increases the amount of the fuel injected in the preceding injection which injects the fuel in the intake stroke until the intake valve is closed. This reduces a temperature rise of the in-cylinder gas in the compression stroke to maintain a low compression end temperature. As a result, it is also advantageous in reducing abnormal combustion in the high speed range.

Reducing the abnormal combustion in the high load range of the engine retards the ignition time, and is thus advantageous in improving the thermal efficiency and the torque.

The present disclosure provides a control method of a spark ignition gasoline engine. The spark ignition gasoline engine includes a cylinder with a geometrical compression ratio of 15 or higher, and is supplied with fuel containing at least gasoline. The control method includes performing fuel injection into the cylinder at a time within a retarded period between a terminal stage of a compression stroke and an initial stage of an expansion stroke when an operating mode of the spark ignition gasoline engine is in a high-load low-speed range; and performing the fuel injection into the cylinder in an intake stroke until an intake valve is closed when the operating mode of the spark ignition gasoline engine is in a high-load high-speed range.

A control method according to the present disclosure includes performing at least preceding injection injecting the fuel into the cylinder in an intake stroke until an intake valve is closed, and succeeding injection injecting the fuel into the cylinder at a time between a terminal stage of a compression stroke and an initial stage of an expansion stroke when an operating mode of the spark ignition gasoline engine is in a high load range; setting an amount of the fuel injected in the succeeding injection larger than the amount of the fuel injected in the preceding injection when the operating mode of the spark ignition gasoline engine is in a low speed range of the high load range, and setting the amount of the fuel injected in the preceding injection larger than the amount of the fuel injected in the succeeding injection when the operating mode of the spark ignition gasoline engine is in a high speed range of the high load range.

Advantages of the Invention

As described above, when the operating mode of the engine body is in the high-load low-speed range, this control system and this control method of the spark ignition gasoline engine perform the fuel injection at the time within the retarded period between the terminal stage of the compression stroke and the initial stage of the expansion stroke. This shortens the reactive time of the unburnt mixture, thereby efficiently reducing abnormal combustion. When the operating mode of the engine body is in the high-load high-speed range, the fuel is injected in the intake stroke. This maintains a low compression end temperature, thereby efficiently reducing abnormal combustion. As a result, the present disclosure is advantageous in improving the fuel efficiency when the operating mode of the engine body in the high load range.

DESCRIPTION OF EMBODIMENTS

Figure 1:
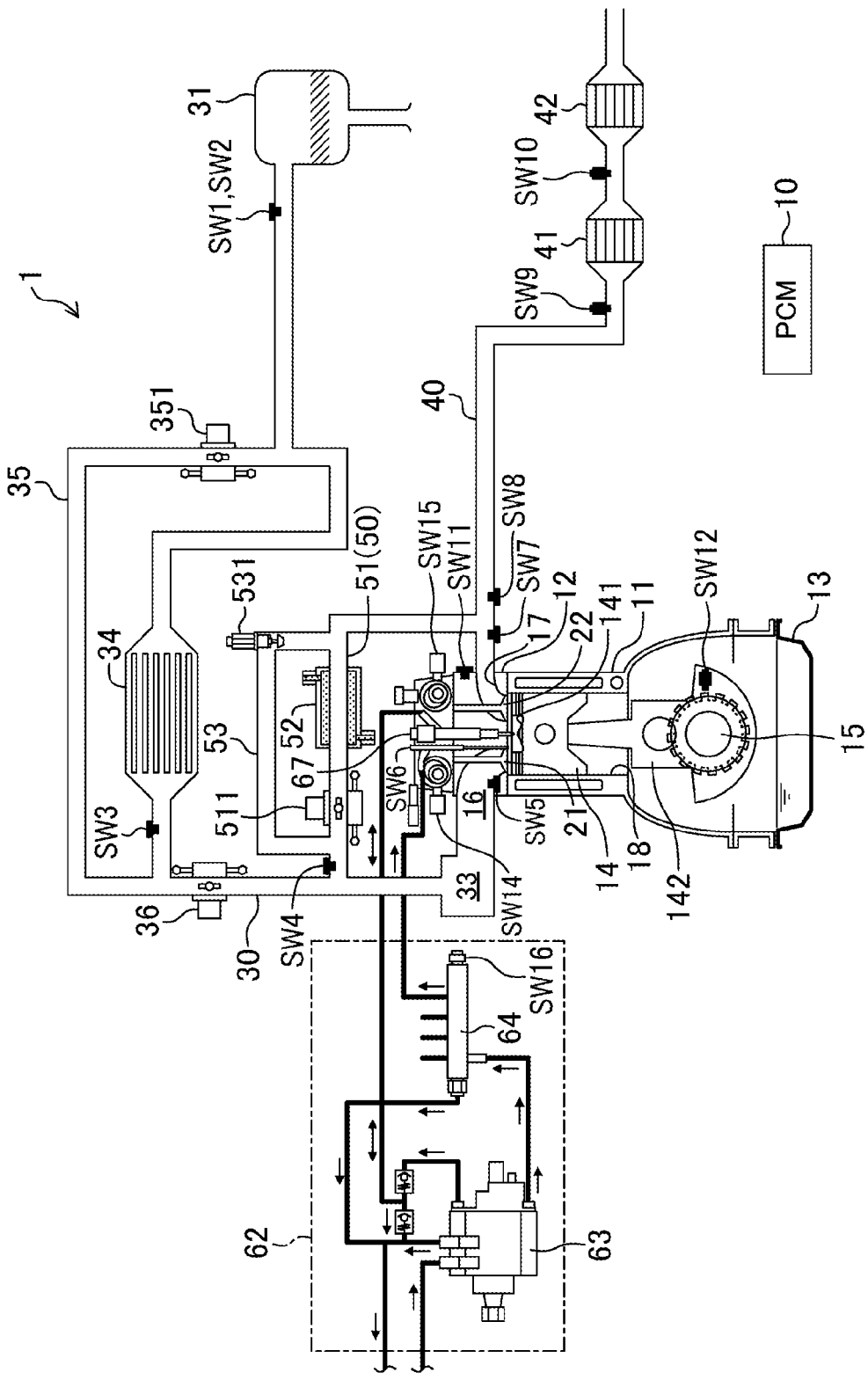
FIG. 1 is a schematic view illustrating the configuration of a spark ignition gasoline engine.
Figure 2:
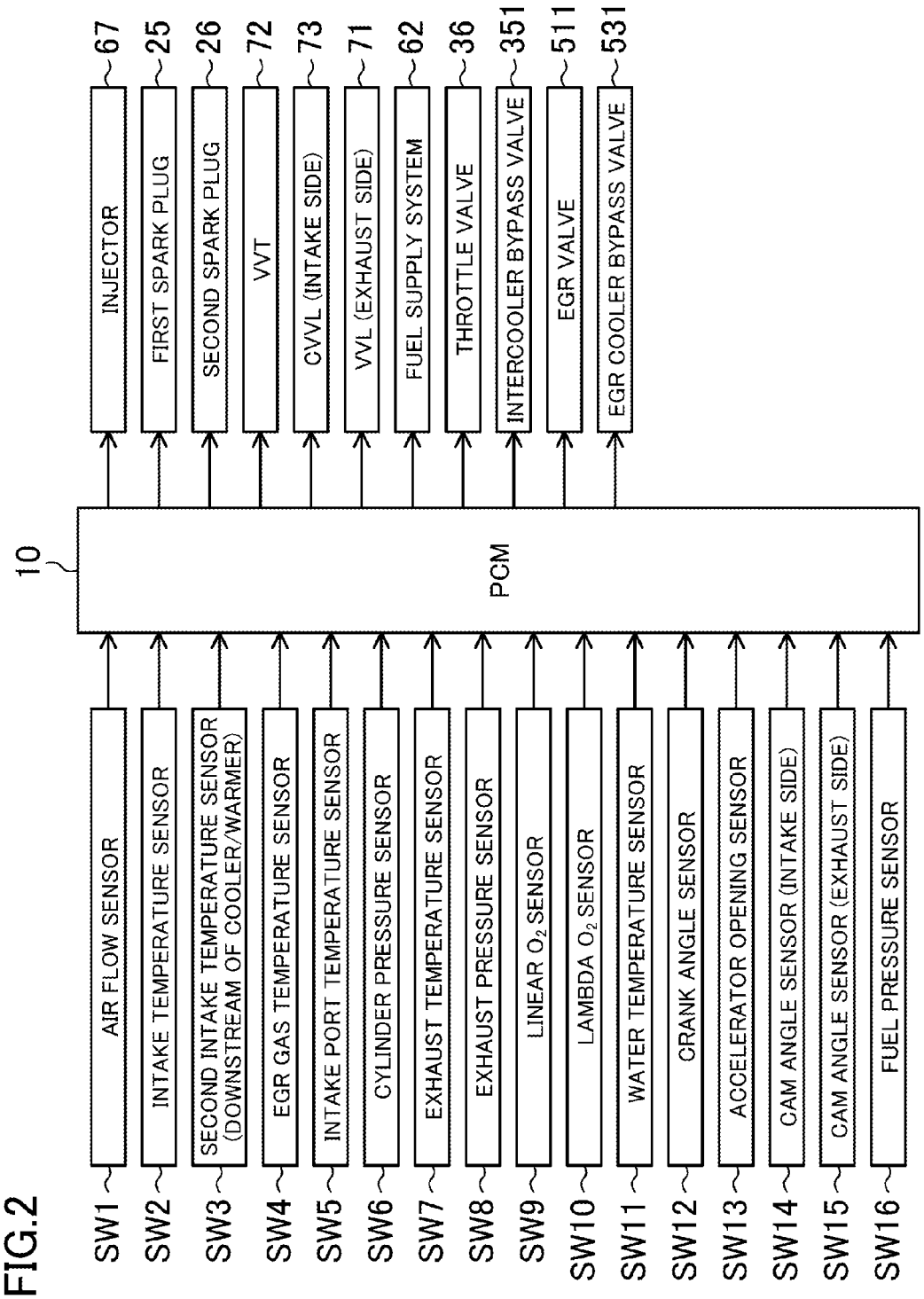
FIG. 2 is a block diagram illustrating the control of the spark ignition gasoline engine.

An embodiment of a control system of a spark ignition gasoline engine will be described hereinafter with reference to the drawings. The embodiment described below is a mere example. FIGS. 1 and 2 illustrate the schematic configuration of an engine (i.e., an engine body) 1. The engine 1 is a spark ignition gasoline engine mounted in a vehicle and supplied with fuel containing at least gasoline. The engine 1 includes a cylinder block 11 provided with a plurality of cylinders 18 (only one is shown), a cylinder head 12 disposed on the cylinder block 11, and an oil pan 13 disposed under the cylinder block 11 and storing lubricant. A piston 14 is reciprocally fitted in each the cylinder 18. The piston 14 is connected to a crankshaft 15 via a con rod 142. A cavity 141 like a re-entrant type of a diesel engine is formed in the top of the piston 14. The cavity 141 faces an injector 67, which will be described later, when the piston 14 is near the compression top dead center. Details of the form of the cavity 141 will be described later.

Figure 3A:
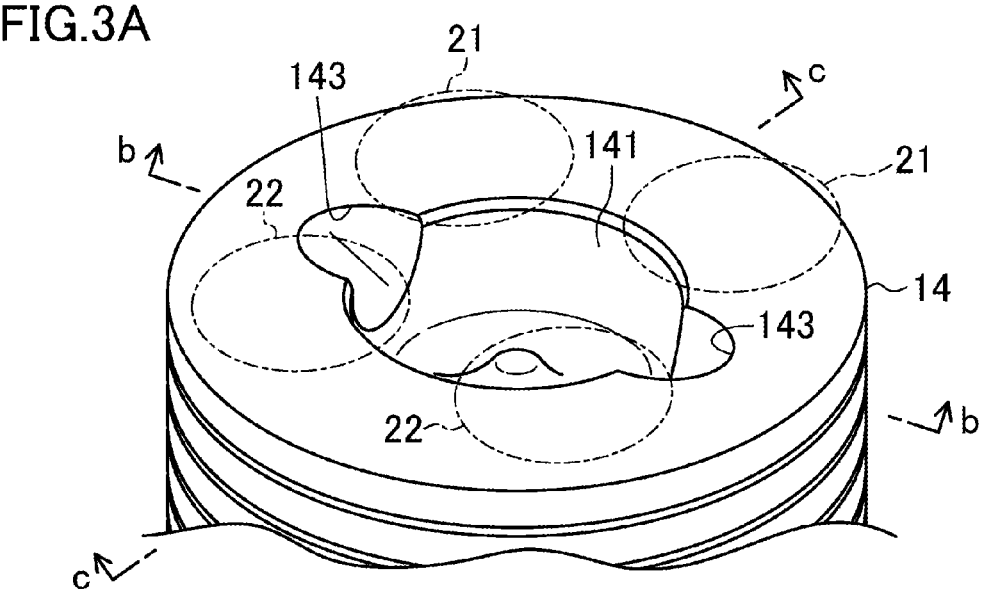
FIG. 3A is an enlarged perspective view of the top surface of a piston.
Figure 3B:
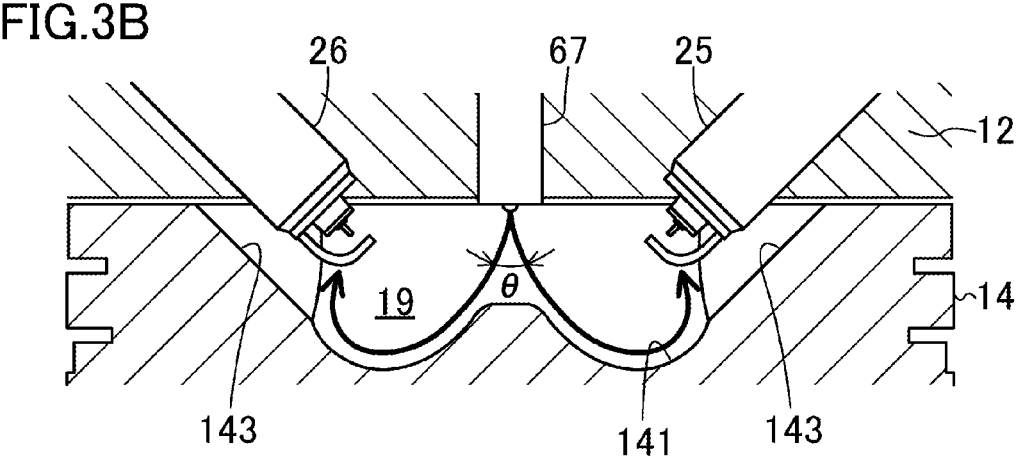
FIG. 3B is an enlarged cross-sectional view of a combustion chamber (a cross-sectional view taken along the line b-b of FIG. 3A).

The cylinder head 12, the cylinder 18, and the piston 14 having the cavity 141 define a combustion chamber 19 (see FIG. 3B). The combustion chamber 19 is not limited to the form shown in the figure. The form of the cavity 141, the form of the top of the piston 14, the form of the ceiling of the combustion chamber 19, etc., may be changed as appropriate.

The engine 1 has a relatively high geometrical compression ratio of 15 or higher to improve the theoretical thermal efficiency, stabilize compression ignition combustion, which will be described later, etc. The geometrical compression ratio may be set as appropriate within the range from 15 to 20, both inclusive.

The cylinder head 12 has an intake port 16 and an exhaust port 17 for each cylinder 18. The intake port 16 and the exhaust port 17 are respectively provided with an intake valve 21 and an exhaust valve 22 opening and closing the opening located close to the combustion chamber 19.

Out of valve systems driving the intake valve 21 and the exhaust valve 22, an exhaust-side valve system has, for example, a hydraulic operation type variable mechanism (hereinafter referred to as a variable valve lift (VVL) mechanism) 71, which switches the operating mode of the exhaust valve 22 between a normal mode and a special mode (see FIG. 2). Although its configuration is not shown in detail, the VVL 71 includes two types of cams with different cam profiles, a first cam with a single cam lobe, and a second cam with two cam lobes, and a lost motion mechanism selectively transmitting the operation state of one of the first and second cams to the exhaust valve. When the operating mode of the first cam is transmitted to the exhaust valve 22, the exhaust valve 22 operates in the normal mode to be opened only once in an exhaust stroke. On the other hand, the operating mode of the second cam is transmitted to the exhaust valve 22, the exhaust valve 22 operates in the special mode to be opened twice in the exhaust stroke and in the intake stroke. A PCM 10, which will be described later, switches the VVL 71 between the normal mode and the special mode in accordance with the operating mode of the engine. Specifically, the special mode is utilized in controlling an internal EGR. For the switch between the normal mode and the special mode, an electromagnetic drive valve system driving the exhaust valve 22 using an electromagnetic actuator may be employed in place of the VVL 71. The internal EGR may be executed not only by the two-time opening of the exhaust valve 22. The internal EGR may be controlled by, for example, opening the intake valve 21 twice, that is, two-time opening of the intake valve 21. Alternatively, in the exhaust stroke or the intake stroke, a negative overlap period of closing both of the intake valve 21 and the exhaust valve 22 may be provided to confine burnt gas in the cylinder 18.

Different from the exhaust-side valve system including the VVL 71, as shown in FIG. 2, the intake-side valve system includes a phase variable mechanism (hereinafter referred to as a variable valve timing (VVT) mechanism) 72 capable of changing the rotation phase of an intake camshaft relative to the crankshaft 15, and a lift amount variable mechanism (hereinafter referred to as a continuously variable valve lift (CVVL)) 73 capable of continuously changing the lift amount of the intake valve 21. The VVT 72 may have a known hydraulic, electromagnetic, or mechanical configuration as appropriate, and the detailed configuration thereof is not shown in the figure. The CVVL 73 may have any one of various known configurations as appropriate, and the detailed configuration thereof is not shown in the figure. The VVT 72 and the CVVL 73 allow the intake valve 21 to change the opening and closing timing as well as the lift amount.

The cylinder head 12 is provided with the injector 67 directly injecting the fuel into the cylinder 18 for each cylinder 18. As shown in FIG. 3B enlarged, the injector 67 is disposed with its nozzle extending from the center of the ceiling of the combustion chamber 19 to the inside of the combustion chamber 19. The injector 67 directly injects into the combustion chamber 19, the fuel of the amount corresponding to the operating mode of the engine 1 at the injection time corresponding to the operating mode of the engine 1. In this example, although not shown in detail, the injector 67 is a multi-hole injector with a plurality of nozzles. This configuration allows the injector 67 to inject the fuel to radially spread fuel spray. As indicated by the arrows of FIG. 3B, the fuel spray, which is injected to radially spread from the center of the combustion chamber 19 when the piston 14 is near the compression top dead center, flows along the wall of the cavity 141 formed in the top of the piston, and then reaches the periphery of spark plugs 25 and 26, which will be described later. In other words, the cavity 141 is formed to contain the fuel spray injected when the piston 14 is near the compression top dead center. This combination of the multi-hole injector 67 and the cavity 141 is advantageous in shortening the time until the fuel spray reaches the periphery of the spark plugs 25 and 26 after fuel injection, and shortening a combustion period.

Figure 3C:
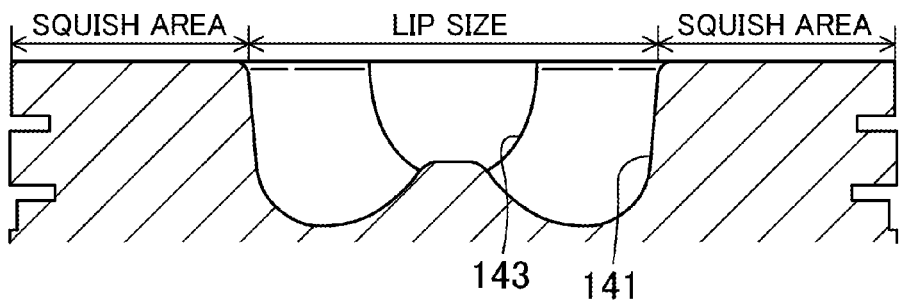
FIG. 3C is an enlarged cross-sectional view of the combustion chamber (a cross-sectional view taken along the line c-c of FIG. 3A).

A fuel injection angle θ of the injector 67 is set to relatively small (e.g., about 45°). Although will be described later in detail, this small injection angle θ reduces attachment of the fuel to the wall of the cylinder 18 and allows the cavity 141 to contain the injected fuel, when the fuel is injected at the time when the piston 14 is located below and slightly apart from the top dead center. As shown in FIG. 3C, this small injection angle θ is also advantageous in relatively reducing the lip size of the cavity 141 (i.e., the size of the upper end opening of the cavity), and in expanding a squish area accordingly. As will be described later, the expansion in the squish area is advantageous in shortening the combustion period. The injector 67 is not limited to the multi-hole injector, but may be an injector of an outward opening valve type.

A fuel tank (not shown) is connected to the injector 67 by a fuel supply passage. In the fuel supply passage, a fuel supply system 62 including a fuel pump 63 and a common rail 64, and capable of supplying the fuel to the injector 67 at a relatively high fuel pressure. The fuel pump 63 pumps the fuel from the fuel tank to the common rail 64. The common rail 64 stores the pumped fuel at a relatively high fuel pressure. The valve of the injector 67 is open, thereby injecting the fuel stored in the common rail 64 from the nozzle of the injector 67. Although not shown, the fuel pump 63 is a plunger pump connected to, for example, a timing belt between a crankshaft and a camshaft. The engine 1 drives the fuel pump 63. The fuel supply system 62 including the pump driven by the engine supplies to the injector 67, the fuel of a high fuel pressure of 40 MPa or higher. As will be described later, the pressure of the fuel supplied to the injector 67 changes in accordance with the operating mode of the engine 1. The fuel supply system 62 is not limited to this configuration.

As shown in FIG. 3B, the spark plugs 25 and 26 igniting an air-fuel mixture in the combustion chamber 19 are attached to the cylinder head 12. (The spark plugs are not shown in FIG. 1.) This engine 1 includes two spark plugs of the first spark plug 25 and the second spark plug 26. The two spark plugs 25 and 26 are disposed to face one another in each cylinder 18 between one of two intake valves 21 and one of two exhaust valves 22, and attached to extend obliquely downward toward the central axis of the cylinder 18 and to penetrate the inside of the cylinder head 12. As shown in FIG. 3B, the tips of the spark plugs 25 and 26 face inside the combustion chamber 19 near the tip of the injector 67 disposed in the center of the combustion chamber 19. As described above, the lip size of the cavity 141 of the piston 14 is relatively small. The cavity 141 has two recesses 143 and 143 facing in the radial direction to reduce interference with the first spark plug 25 and the second spark plug 26 (see FIGS. 3B and 3C). As clear from FIGS. 3A and 3C, the body of the cavity 141 is in a circular form. The fuel spray radially injected by the injector 67 in the center position of the cavity 141 spreads almost uniformly in the cavity 141 to form a homogeneous mixture.

As shown in FIG. 1, an intake passage 30 is connected to one side surface of the engine 1 to communicate with the intake port 16 of each cylinder 18. On the other hand, an exhaust passage 40, which exhausts the burnt gas (i.e., exhaust gas) from the combustion chamber 19 of each cylinder 18, is connected to the other side of the engine 1.

An air cleaner 31 filtering intake air is disposed at the upstream end of the intake passage 30. A surge tank 33 is disposed near the downstream end of the intake passage 30. The intake passage 30 is divided into independent passages for the cylinders 18 downstream of the surge tank 33. The downstream end of each independent passage is connected to the intake port 16 of each cylinder 18.

A water-cooling intercooler/warmer 34 cooling or heating air, and a throttle valve 36 adjusting the amount of intake air to each cylinder 18 are disposed in the intake passage 30 between the air cleaner 31 and the surge tank 33. The intake passage 30 is also connected to an intercooler bypass passage 35 bypassing the intercooler/warmer 34. This intercooler bypass passage 35 is provided with an intercooler bypass valve 351 for adjusting the flow rate of the air passing through the passage 35. Adjusting the ratio of the flow rate of the intercooler bypass passage 35 to the flow rate of the intercooler/warmer 34 by adjusting the opening degree of the intercooler bypass valve 351 adjusts the temperature of fresh air introduced into the cylinder 18.

The upstream of the exhaust passage 40 is an exhaust manifold including the independent passages divided for the cylinders 18 and connected to the outside of the exhaust ports 17, and aggregation of the independent passages. A direct catalyst container 41 and an underfoot catalyst container 42 are supplied, as exhaust purifiers which purify harmful components in the exhaust gas, downstream of the exhaust manifold in the exhaust passage 40. Each of the direct catalyst container 41 and the underfoot catalyst container 42 includes a tubular case, and, for example, three-way catalyst disposed in the passage inside the case.

The portion of the intake passage 30 between the surge tank 33 and the throttle valve 36 is connected to the upstream of the direct catalyst container 41 in the exhaust passage 40 via an EGR passage 50 for recirculating part of the exhaust gas in the intake passage 30. This EGR passage 50 includes a main passage 51 provided with an EGR cooler 52 cooling the exhaust gas with engine cooling water, and an EGR cooler bypass passage 53 for bypassing the EGR cooler 52. The main passage 51 is provided with an EGR valve 511 for adjusting the amount of the exhaust gas recirculated to the intake passage 30. The EGR cooler bypass passage 53 is provided with the EGR cooler bypass valve 531 for adjusting the flow rate of the exhaust gas circulating through the EGR cooler bypass passage 53.

The engine 1 configured as above is controlled by a powertrain control module (hereinafter referred to as a PCM) 10. The PCM 10 is a microprocessor including a CPU, a memory, a counter timer group, an interface, and paths connecting these units. The PCM 10 is a controller.

As shown in FIGS. 1 and 2, detection signals of various sensors SW1-SW16 are input to the PCM 10. The various sensors include the following sensors. An air flow sensor SW1 detects the flow rate of the fresh air downstream of the air cleaner 31. An intake temperature sensor SW2 detects the temperature of the fresh air. A second intake temperature sensor SW3 is disposed downstream of the intercooler/warmer 34, and detects the temperature of the fresh air after passing through the intercooler/warmer 34. An EGR gas temperature sensor SW4 is disposed near the portion of the EGR passage 50 connected to the intake passage 30, and detects the temperature of external EGR gas. An intake port temperature sensor SW5 is attached to the intake port 16, and detects the temperature of intake air immediately before flowing into the cylinder 18. A cylinder pressure sensor SW6 is attached to the cylinder head 12, and detects the pressure inside the cylinder 18. An exhaust temperature sensor SW7 and an exhaust pressure sensor SW8 are disposed near the portion of the exhaust passage 40 connected to the EGR passage 50, and detect the temperature and the pressure of the exhaust gas, respectively. A linear $O_2$ sensor SW9 is disposed upstream of the direct catalyst container 41, and detects the concentration of oxygen in the exhaust gas. A lambda $O_2$ sensor SW10 is disposed between the direct catalyst container 41 and the underfoot catalyst container 42, and detects the concentration of oxygen in the exhaust gas. A water temperature sensor SW11 detects the temperature of the engine cooling water. A crank angle sensor SW12 detects the rotation angle of the crankshaft 15. An accelerator opening sensor SW13 detects the opening degree of the accelerator corresponding to the amount of operation of an accelerator pedal (not shown) of the vehicle. An intake-side and exhaust-side cam angle sensors SW14 and SW15 are provided. A fuel pressure sensor SW16 is attached to the common rail 64 of the fuel supply system 62, and detects the pressure of the fuel supplied to the injector 67.

The PCM 10 performs various types of calculation based on these detection signals to determine the conditions of the engine 1 and the vehicle. In accordance with the determination result, the PCM 10 outputs control signals to the actuators of the injector 67, the first and second spark plugs 25 and 26, the intake valve-side VVT 72 and CVVL 73, the exhaust valve-side VVL 71, the fuel supply system 62, and the various valves (e.g., the throttle valve 36, the intercooler bypass valve 351, the EGR valve 511, and the EGR cooler bypass valve 531). As such, the PCM 10 operates the engine 1.

Figure 4:
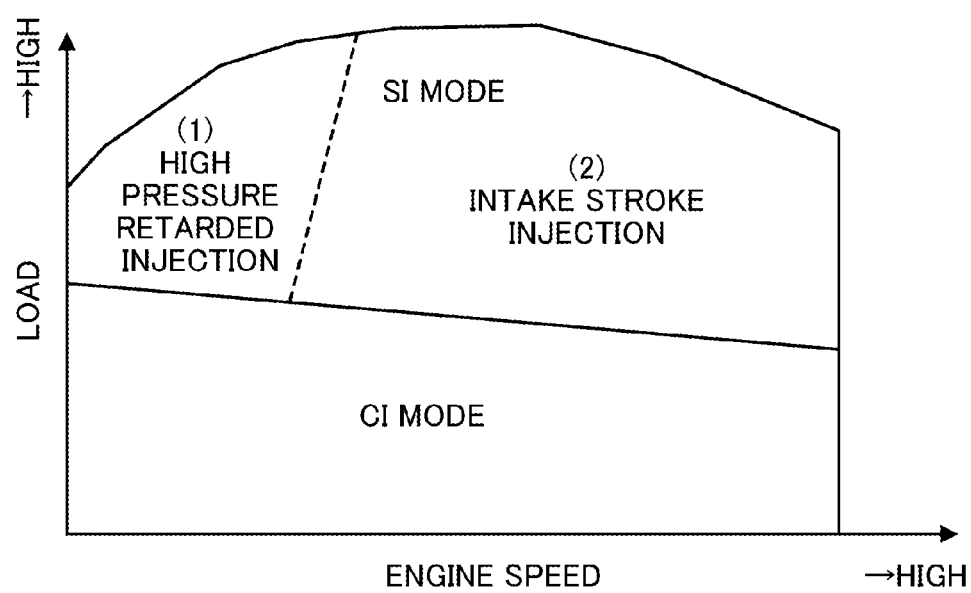
FIG. 4 illustrates the operation range of the engine.

FIG. 4 illustrates an example operation range of the engine 1. This engine 1 aims to improve the fuel efficiency and the exhaust emission. Within a low load range where the engine has a relatively low load, the engine 1 does not perform ignition with the spark plugs 25 and 26 but performs compression ignition combustion by compression auto-ignition. However, with an increase in the load of the engine 1, the compression ignition combustion becomes rapid to cause problems such as combustion noise. Thus, within a high load range where the engine has a relatively high load, this engine 1 stops the compression ignition combustion, and performs the spark ignition combustion using the spark plugs 25 and 26. The engine 1 switches between a compression ignition (CI) mode performing the compression ignition combustion, and a spark ignition (SI) mode performing the spark ignition combustion in accordance with the operating mode of the engine 1, particularly in accordance with the level of the load of the engine 1. The boundary between the modes is not limited to what is shown in the figure.

In the CI mode, the engine 1 basically injects the fuel into the cylinder 18, for example, at a relatively early time in the intake stroke or the compression stroke. This forms a relatively homogeneous lean air-fuel mixture. The air-fuel mixture is subjected to the compression auto-ignition at a time near the compression top dead center. The amount of the injected fuel is determined in accordance with the load of the engine 1.

In the CI mode, the engine 1 performs two-time opening for exhaust to open the exhaust valve 22 in the intake stroke by controlling the VVL 71, thereby introducing internal EGR gas into the cylinder 18. The introduction of the internal EGR gas increases a compression end temperature and stabilizes the compression ignition combustion.

The temperature inside the cylinder 18 automatically rises with an increase in the load of the engine. Thus, in view of reducing preignition, the engine 1 reduces the amount of the internal EGR when the engine has a high load. The amount of the internal EGR may be adjusted, for example, by adjusting the lift amount of the intake valve 21 by controlling the CVVL 73. Alternatively, the amount of the internal EGR may be adjusted by adjusting the opening degree of the throttle valve 36.

Assume that the load of the engine further increases to reach, for example, the operation range shown in FIG. 4. Near the boundary between the CI mode and the SI mode, execution of the internal EGR increases the cylinder temperature, and the compression ignition becomes difficult to control. In a high load operation range of the CI mode, the engine 1 stops the execution of the internal EGR, and instead, opens the EGR valve 511 to introduce the external EGR gas cooled by the EGR cooler 52 into the cylinder 18. This lowers the cylinder temperature and controls the compression ignition.

On the other hand, in the SI mode, the engine 1 basically injects the fuel into the cylinder 18 between the intake stroke and the initial stage of the expansion stroke, as will be described later in detail. This forms a homogeneous or stratified air-fuel mixture in the cylinder. The spark plugs are driven at a time near the compression top dead center, thereby igniting the air-fuel mixture. In the SI mode, the engine 1 sets the air-fuel ratio of the air-fuel mixture to a stoichiometric air-fuel ratio (i.e., $\lambda=1$). This enables utilization of three-way catalyst, which is advantageous in improving emission performance.

In the SI mode, the engine 1 fully opens the throttle valve 36, and adjusts the opening degree of the EGR valve 511 to adjust the amount of the fresh air to be introduced into the cylinder 18 and the amount of the external EGR gas, thereby adjusting the filling amount. This is advantageous in reducing pump losses and cooling losses. Introducing the cooled external EGR gas contributes to reduction in abnormal combustion, and reduces generation of Raw NOx. In a full load range, the engine 1 closes the EGR valve 511 to stop the external EGR.

As described above, the geometrical compression ratio of the engine 1 is set to 15 or higher (e.g., 18). The high compression ratio increases the compression end temperature and the compression end pressure, and is thus advantageous in stabilizing the compression ignition combustion in the CI mode. On the other hand, the engine 1 with the high compression ratio selects the SI mode in a high load range, thereby causing abnormal combustion such as preignition and knocking.

Assume that the operating mode of the engine is in a high-load low-speed range (see (1) of FIG. 4, the "low speed range" here corresponds to a low speed range where the operation range of the engine 1 is divided into three of low, middle and high speed ranges). At this time, the engine 1 executes the SI combustion using fuel injection significantly different from the conventional techniques to reduce abnormal combustion. Specifically, in this fuel injection, the fuel is injected from the injector 67 into the cylinder 18 at a fuel pressure much higher than the conventional techniques in a largely retarded period between the terminal stage of the compression stroke and the initial stage of the expansion stroke (the period is hereinafter referred to as a "retarded period"). This characteristic fuel injection is hereinafter referred to as "high pressure retarded injection" or simply "retarded injection."

On the other hand, when the operating mode of the engine is within a high-load high-speed range (see (2) of FIG. 4, the "high speed range" corresponds to medium and high speed ranges where the operation range of the engine 1 is divided into three of low, medium, and high speed ranges), the engine 1 performs the fuel injection not in a retarded period but in the intake stroke where the intake valve 21 is open. This fuel injection is hereinafter referred to as "intake stroke injection."

Figure 5:
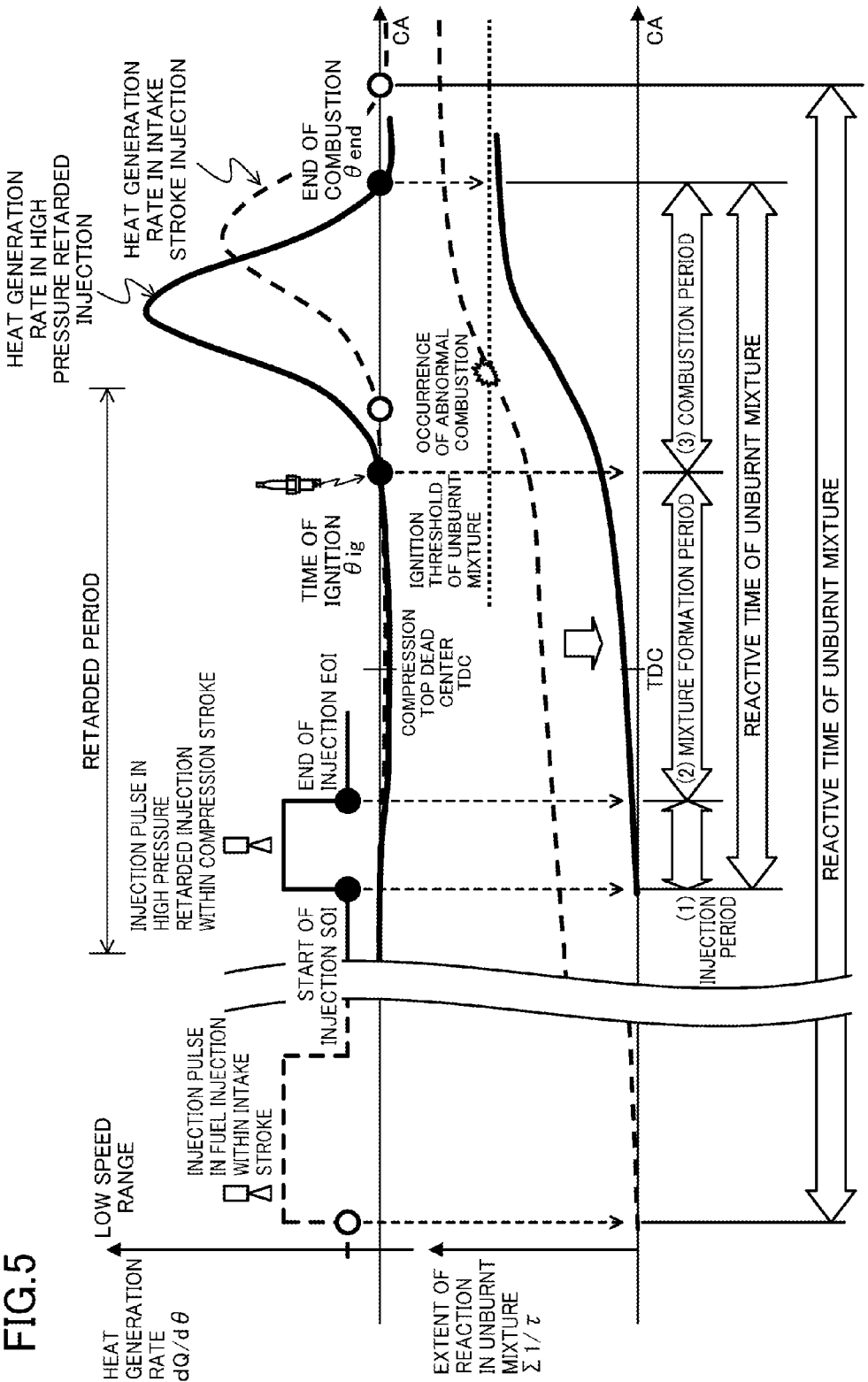
FIG. 5 illustrates the comparison between the state of SI combustion by high pressure retarded injection in a low speed range, and the state of conventional SI combustion.

High pressure retarded injection will be described hereinafter with reference to the drawings. FIG. 5 illustrates the comparison between the above-described SI combustion by the high pressure retarded injection (indicated by the solid line), and the conventional SI combustion injecting the fuel in the intake stroke (indicated by the broken line), in the heat generation rate (the upper portion) and the extent of reaction in the unburnt mixture (the lower portion). In FIG. 5, the horizontal axis represents a crank angle. The comparison is based on the assumption that the operating modes of the engines 1 are both in a high-load low-speed range, and the same amounts of fuel is injected in the SI combustion by the high pressure retarded injection and in the conventional SI combustion.

In the conventional SI combustion, a predetermined amount of fuel is injected into the cylinder 18 in the intake stroke (see the broken line of the upper portion of FIG. 5). In the cylinder 18, a relatively homogeneous mixture is formed until the piston 14 reaches the compression top dead center after the fuel injection. In this example, the ignition is executed at a predetermined time indicated by a white circle after the compression top dead center, thereby starting combustion. After the start of the combustion, as indicated by the broken line in the upper portion of FIG. 5, the heat generation rate has its peak and the combustion ends. The period between the start of the fuel injection and the end of the combustion corresponds to the reactive time of the unburnt mixture (hereinafter simply referred to as a "reactive time"). As indicated by the broken line in the lower portion of FIG. 5, the reaction of the unburnt mixture gradually progresses. The dashed line in the portion indicates the threshold of ignition, which is the extent of reaction of the unburnt mixture to be ignited. The conventional SI combustion is performed in a low speed range, and in addition, requires an extremely long reactive time. During the long period, the reaction of the unburnt mixture further progresses, the extent of reaction of the unburnt mixture exceeds the threshold of ignition before or after the ignition. This causes abnormal combustion such as preignition or knocking.

By contrast, the high pressure retarded injection aims to shorten the reactive time, thereby reducing abnormal combustion. Specifically, as shown in FIG. 5, the reactive time is the sum of the period during which the injector 67 injects the fuel (i.e., (1) an injection period), the period until a burnable mixture is formed around the spark plugs 25 and 26 after the end of the injection (i.e., (2) a mixture formation period), and the period until the combustion started by the ignition ends (i.e., (3) a combustion period), that is, (1)+(2)+(3). The high pressure retarded injection shortens the injection period, the mixture formation period, and the combustion period, thereby shortening the reactive time. This will be described sequentially.

First, the high fuel pressure relatively increases the amount of the fuel injected from the injector 67 per unit time. Thus, as shown in the graph (1) in the middle of FIG. 6, where the amount of the injected fuel is constant, the relation between fuel pressure and the fuel injection period is roughly described as follows. The injection period increases with the decreasing fuel pressure. The injection period decreases with the increasing fuel pressure. Therefore, the high pressure retarded injection, in which the fuel pressure is much higher than that in the conventional injection, shortens the injection period.

The high fuel pressure is advantageous in atomizing the fuel spray injected into the cylinder 18, and increasing the flying distance of the fuel spray. Thus, as shown in the graph (A) in the lower stage of FIG. 6, the relation between the fuel pressure and the fuel evaporation time is roughly described as follows. The fuel evaporation time increases with the decreasing fuel pressure. The fuel evaporation time decreases with the increasing fuel pressure. As shown in the graph (B) in the lower stage of FIG. 6, the relation between the fuel pressure and the time until the fuel spray reaches the periphery of the spark plugs 25 and 26 is roughly described as follows. The time to reach increases with the decreasing fuel pressure. The time to reach decreases with the increasing fuel pressure. The time until the fuel spray reaches the periphery of the spark plugs 25 and 26 can be calculated based on the flying distance of the spray from the tip of the injector 67 to the spark plug 25 or the spark plug 26, and the speed of fuel injection, which is proportional to the fuel pressure. The mixture formation period is the sum of the fuel evaporation time and the time until the fuel spray reaches the periphery of the spark plugs 25 and 26 ((A)+(B)). Thus, as shown in the graph (2) in the middle stage of FIG. 6, the mixture formation period decreases with the increasing fuel pressure. The high pressure retarded injection, which sets the fuel pressure much higher than that in the conventional injection, shortens the fuel evaporation time and the time until the fuel spray reaches the periphery of the spark plugs 25 and 26. As a result, the mixture formation period decreases. By contrast, as indicated by the white circle in the same graph, the conventional intake stroke injection under a low fuel pressure requires a much longer mixture formation period. As described above, the combination of the multi-hole injector 67 and the cavity 141 is advantageous in shortening the time until the fuel spray reaches the periphery of the spark plugs 25 and 26 after the fuel injection. As a result, the mixture formation period is effectively reduced.

Shortening the injection period and the mixture formation period relatively delays the time of the fuel injection, more precisely, the start of the injection. In the high pressure retarded injection, as shown in the upper portion of FIG. 5, the fuel is injected in the retarded period between the terminal stage of the compression stroke and the initial stage of the expansion stroke. The fuel is injected into the cylinder 18 at the high fuel pressure, thereby increasing turbulence in the cylinder to increase the turbulence energy in the cylinder 18. This high turbulence energy is advantageous in shortening the combustion period together with the relatively retarded time of the fuel injection.

As shown in the graph (D) in the lower stage of FIG. 6, where the fuel is injected in the retarded period, the relation between the fuel pressure and the turbulence energy in the combustion period is roughly described as follows. The turbulence energy decreases with the decreasing fuel pressure. The turbulence energy increases with the increasing fuel pressure. In the graph, the broken line indicates an example where the fuel is injected in the intake stroke. Assume that the fuel is injected into the cylinder 18 at a high fuel pressure. Even so, if the injection time is within the intake stroke, the time until the ignition is long, and the inside of the cylinder 18 is compressed in the compression stroke after the intake stroke. This reduces the turbulence in the cylinder 18. As a result, where the fuel is injected in the intake stroke, the turbulence energy in the combustion period is relatively low regardless of the level of the fuel pressure.

As shown in the graph (C) in the lower stage of FIG. 6, the relation between the turbulence energy in the combustion period and the combustion period is roughly described as follows. The combustion period increases with the decreasing turbulence energy. The combustion period decreases with the increasing turbulence energy. Thus, as clear from graphs (C) and (D) of FIG. 6, the relation between the fuel pressure and the combustion period is as follows. As shown in the graph (3) in the middle stage of FIG. 6, the combustion period increases with the decreasing fuel pressure, and the combustion period decreases with the increasing fuel pressure. That is, the high pressure retarded injection shortens the combustion period. By contrast, as indicated by the white circle in the graph, the conventional intake stroke injection at a low fuel pressure requires the long combustion period. The multi-hole injector 67 is advantageous in improving the turbulence energy in the cylinder 18, and effective in shortening the combustion period. The combination of the multi-hole injector 67 and the cavity 141 allows the cavity 141 to contain the fuel spray, thereby effectively shortening the combustion period.

Figure 6:
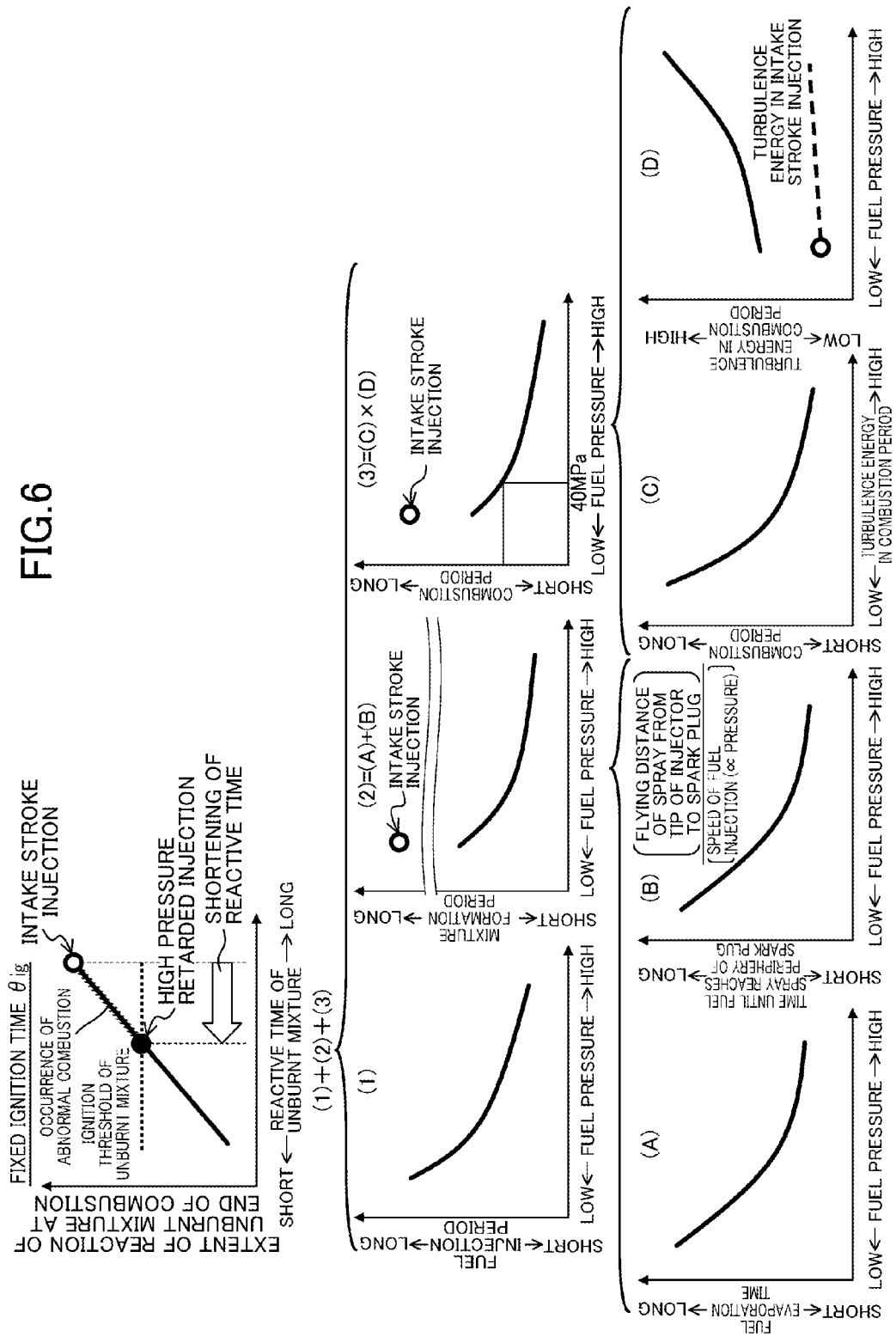
FIG. 6 illustrates the relation between the reactive time of an unburnt mixture and the extent of reaction in the unburnt mixture at the end of combustion. A graph (the graph at the upper stage) illustrates the difference between the SI combustion by the high pressure retarded injection and the conventional SI combustion. Other graphs (the graphs in the middle and lower stages) illustrate the relation between fuel pressure and parameters associated with the reactive time of the unburnt mixture.

Clear from the relation between the fuel pressure and the combustion period shown in the graph (3) of FIG. 6, in other words, from the curved shape, the combustion period is efficiently shortened by setting the fuel pressure to, for example, 40 MPa or higher. The fuel pressure of 40 MPa or higher shortens both of the injection period and the mixture formation period. The fuel pressure is preferably set as appropriate in accordance with the characteristics of the fuel to be used, which contains at least gasoline. The upper limit may be, for example, 120 MPa.

As such, the high pressure retarded injection shortens all of the injection period, the mixture formation period, and the combustion period. As a result, as shown in FIG. 5, the reactive time of the unburnt mixture between the start of the fuel injection SOI and the end of the combustion θend is largely shortened as compared to the conventional fuel injection in the intake stroke. A result of shortening the reactive time is shown in the graph in the upper stage of FIG. 6. In the conventional intake stroke injection at a low fuel pressure, as indicated by the white circle, the extent of reaction in the unburnt mixture exceeds the threshold of ignition at the end of the combustion, thereby causing abnormal combustion. As indicated by the black circle, the high pressure retarded injection reduces the extent of the reaction of the unburnt mixture at the end of the combustion, thereby reducing the abnormal combustion. In the injection indicated by the white and black circles in the upper graph of FIG. 6, the mixture is ignited at the same time.

The high pressure retarded injection employs creative injection of fuel into the cylinder 18 to reduce abnormal combustion. Different from the injection, retarding the ignition time to reduce abnormal combustion is conventionally known. Retarding the ignition time reduces a rise in the temperature and the pressure of the unburnt mixture, thereby reducing the extent of the reaction. However, retarding the ignition time reduces the thermal efficiency and the torque. Where the high pressure retarded injection is performed, the creative fuel injection reduces abnormal combustion to retard the ignition time. This improves the thermal efficiency and the torque. That is, the high pressure retarded injection not only reduces the abnormal combustion, but also retards the ignition time by the time corresponding to the reduction. This is advantageous in improving the fuel efficiency.

Figure 7:
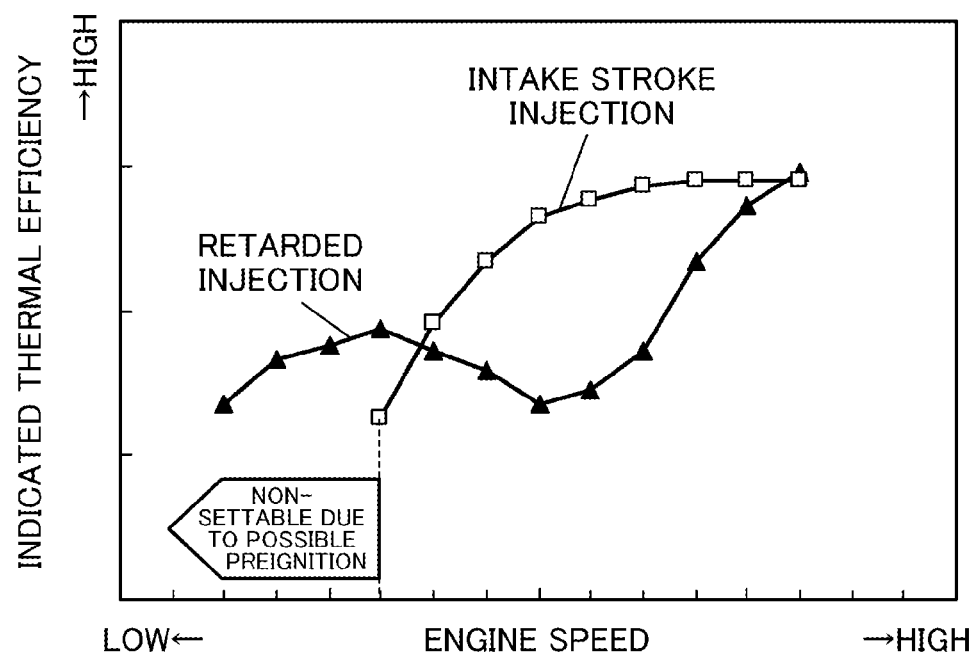
FIG. 7 illustrates example relation between an engine speed and indicated thermal efficiency in retarded injection and intake stroke injection.

As described above, the high pressure retarded injection performs the fuel injection within the retarded period to shorten the reactive time of the unburnt mixture. This shortening of the reactive time is effective in a low speed range where the speed of the engine 1 is relatively low, since the actual time for changing the crank angle is long. However, it is ineffective in a high speed range where the speed of the engine 1 is relatively high, since the actual time for changing the crank angle is short. For example, as shown in FIG. 7, the retarded injection provides a high indicated thermal efficiency when the engine speed is relatively low, and reduces the indicated thermal efficiency when the engine speed increases.

Figure 8A:
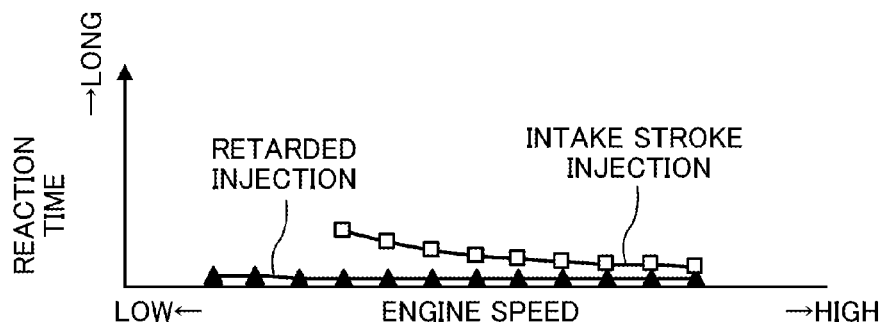
FIG. 8A illustrates example relation between the engine speed and the reaction time of the unburnt mixture in the retarded injection and the intake stroke injection.
Figure 8B:
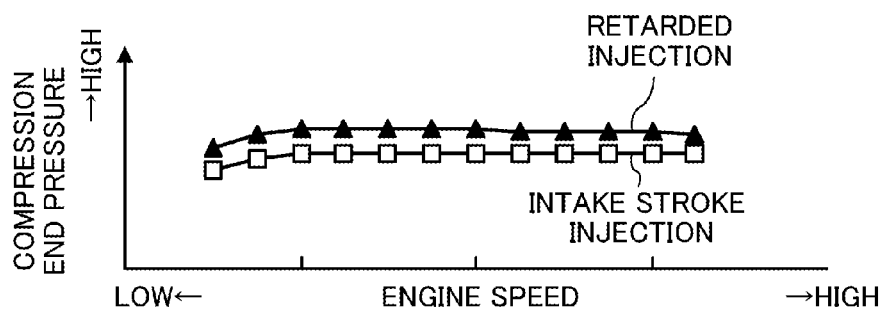
FIG. 8B illustrates example relation between the engine speed and compression end pressure in the retarded injection and the intake stroke injection.
Figure 8C:
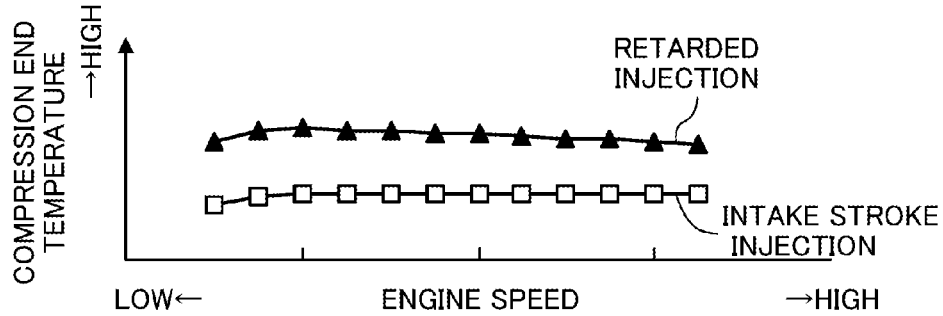
FIG. 8C illustrates example relation between the engine speed, and a compression end temperature in the retarded injection and the intake stroke injection.

FIG. 8A illustrates a change in the reactive time of the unburnt mixture relative to the engine speed. In the retarded injection, the reactive time is almost the same regardless of the degree of the engine speed. On the other hand, since the retarded injection sets the time of the fuel injection around the compression top dead center, the air not containing the fuel, in other words, the air with a high specific heat ratio is compressed in the compression stroke. This increases the temperature in the cylinder 18 in the compression top dead center (i.e., the compression end temperature). For example, FIG. 8B illustrates the difference between the compression end pressure in the retarded injection and the compression end pressure in the intake stroke injection. FIG. 8C illustrates the difference between the compression end temperature in the retarded injection and the compression end temperature in the intake stroke injection. According to the graphs, in the retarded injection when the specific heat ratio of the in-cylinder gas is relatively high in the compression stroke, the compression end pressure and the compression end temperature are relatively high. Out of them, the compression end temperature is particularly high. This high compression end temperature causes knocking, and thus the ignition time needs to be retarded in the retarded injection to reduce knocking. This reduces the thermal efficiency in the retarded injection at high engine speed, as shown in FIG. 7.

Figure 9:
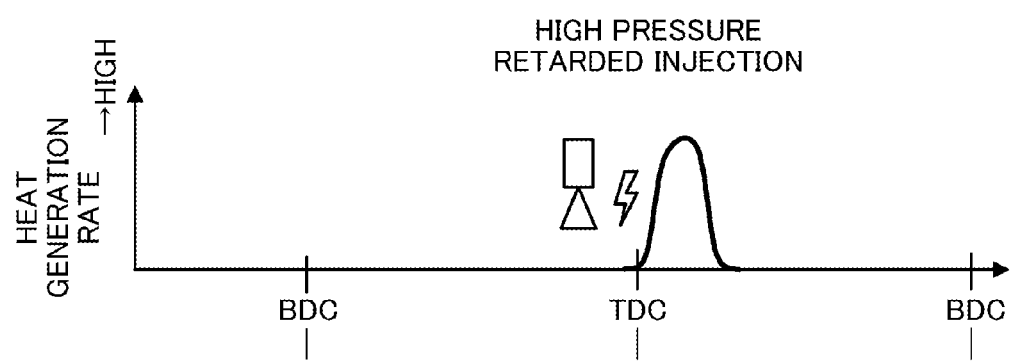
FIG. 9(a) illustrates example fuel injection time and ignition time in the retarded injection, and an example heat generation rate according thereto.
FIG. 9(b) illustrates example fuel injection time and ignition time in the intake stroke injection, and a heat generation rate according thereto.
Figure 9:
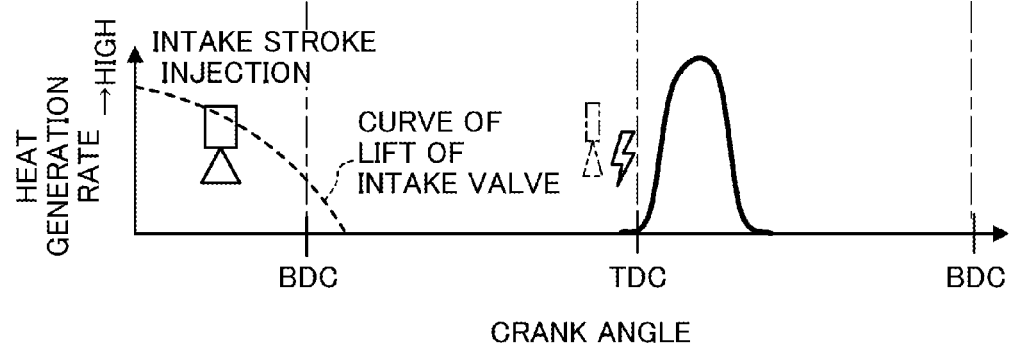

Thus, this engine 1 performs not the retarded injection but the intake stroke injection in the high-load high-speed range. FIG. 9 illustrate the comparison between the high pressure retarded injection (see FIG. 9(a)) and the intake stroke injection (see FIG. 9(b)) in the injection time and the ignition time. The shown injection time and ignition time are mere examples in the high pressure retarded injection and the intake stroke injection. The injection time and the ignition time are not limited to what is shown in the graphs.

As described above, the high pressure retarded injection performs the fuel injection within the retarded period between the terminal stage of the compression stroke and the initial stage of the expansion stroke (at the terminal stage of the compression stroke before the compression top dead center in the graph), and performs the ignition at a time near the compression top dead center. This ignition is performed by driving any one of the first spark plug 25 or the second spark plug 26. This is because the high pressure retarded injection secures a sufficiently short combustion period. This starts the combustion. As indicated by the solid line in the graph, the heat generation rate has its peak, and the combustion ends. Both of the first and second spark plugs 25 and 26 may be driven.

Different from the high pressure retarded injection, as indicated by the broken line in FIG. 9(b), the intake stroke injection performs the fuel injection in the intake stroke period until the intake valve 21 is closed, in other words, while the intake valve 21 is open. In the graph, the operation range of the engine 1 is in the high-load high-speed range, and thus the time of closing the intake valve 21 is set later than the intake bottom dead center. This intake stroke injection is preferably performed at a time when the position of the piston 14 is near the intake top dead center so that the fuel is contained in the cavity 141 of the piston 14 as much as possible. As described above, since the injection angle θ of the injector 67 is set relatively small, the fuel can be easily contained in the cavity 141 even if the piston 14 is distant from the intake top dead center. That is, setting the small injection angle θ of the injector 67 increases the flexibility of the fuel injection time in the intake stroke injection.

The intake stroke injection injects the fuel where the cylinder pressure is relatively low, and in addition, there is no need to shorten the reaction time of the unburnt mixture as described above. Therefore, a high fuel pressure as in the high pressure retarded injection is not required. Thus, the intake stroke injection requires a lower fuel pressure than the fuel pressure in the high pressure retarded injection. The fuel pressure may be lower than 40 MPa, for example, about 20 MPa. This reduces the driving of the fuel pump 63, and the mechanical loss of the engine 1, and is thus advantageous in improving the fuel efficiency.

As such, the intake stroke injection reduces the specific heat ratio of the in-cylinder gas (i.e., the air-fuel mixture containing the fuel) in the compression stroke, thereby lowering the compression end temperature. The lowering of the compression end temperature reduces knocking, thereby retarding the ignition time. Similar to the high pressure retarded injection, the intake stroke injection performs the ignition at a time near the compression top dead center. However, the ignition in the intake stroke injection needs to shorten the combustion period. In this point of view, dual point ignition driving both of the first and second spark plugs 25 and 26 is performed. The first and second spark plugs 25 and 26 may ignite the mixture at the same time. The first and second spark plugs 25 and 26 may be driven sequentially.

Figure 10:
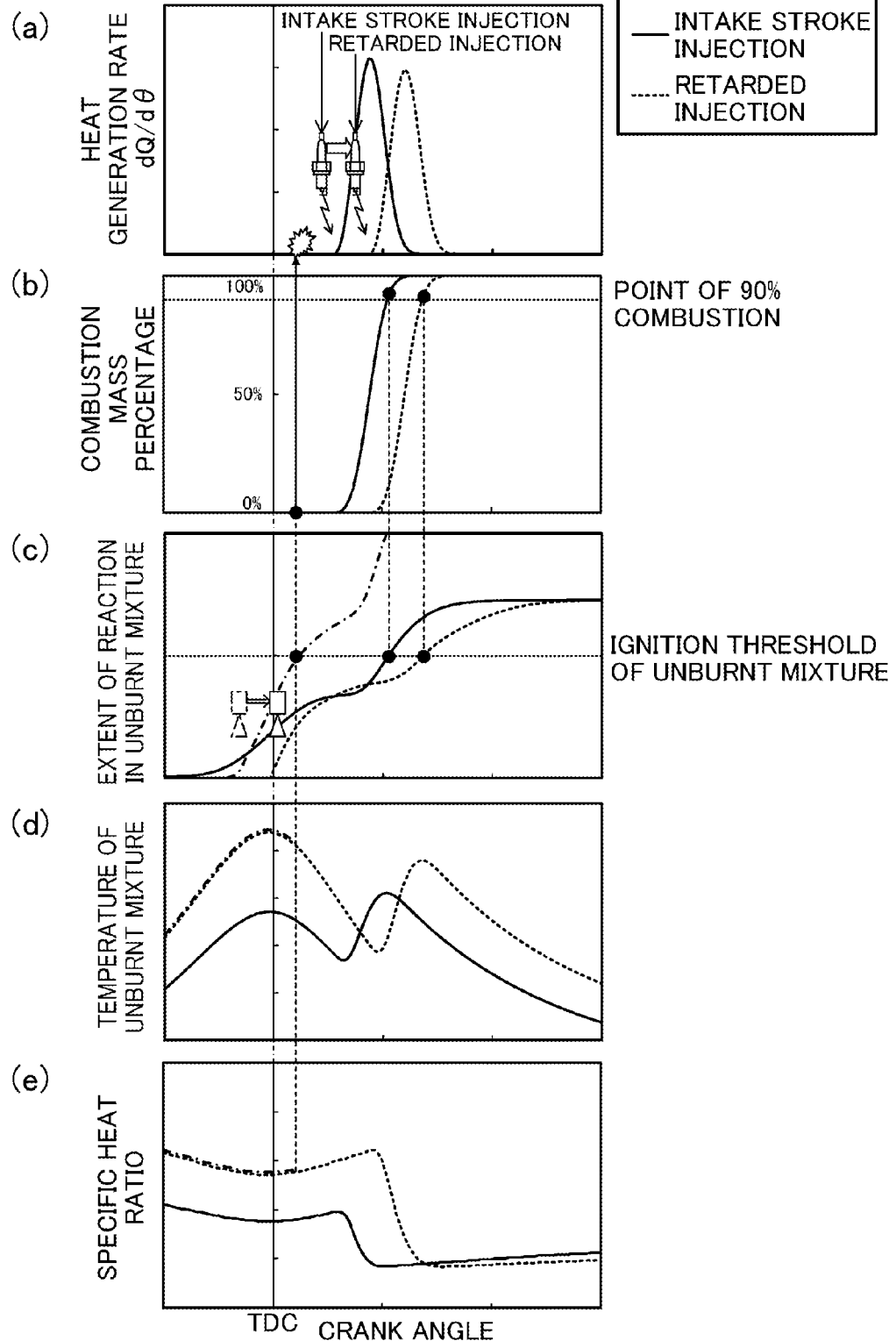
FIG. 10 illustrate the comparison between changes of the intake stroke injection and the retarded injection in a high speed range regarding (a) the heat generation rate, (b) the combustion mass percentage, (c) the extent of reaction in the unburnt mixture, (d) the temperature of the unburnt mixture, and (e) the specific heat ratio.

Differences between the high pressure retarded injection and the intake stroke injection in the conditions inside the cylinder and the combustion conditions where the engine 1 is within a high-load high-speed range will be described with reference to FIG. 10. FIG. 10 illustrate changes in (a) the heat generation rate, (b) the combustion mass percentage, (c) the extent of reaction in the unburnt mixture, (d) the temperature of the unburnt mixture, and (e) the specific heat ratio relative to the crank angle in the high pressure retarded injection and in the intake stroke injection.

First, as indicated by the dashed line in FIG. 10(c), example high pressure retarded injection is based on the assumption that the fuel is injected before the compression top dead center. In the high pressure retarded injection, as indicated by the dashed line in FIG. 10(e), the specific heat ratio of the in-cylinder gas is relatively high in the compression stroke. Thus, as indicated by the dashed line in FIG. 10(d), the temperature of the unburnt mixture largely increases in the compression stroke. Although not shown, the pressure of the unburnt mixture in the high pressure retarded injection is almost unchanged from the intake stroke injection.

In the high pressure retarded injection, as indicated by the dashed line in FIG. 10(c), due to this high cylinder temperature, the extent of reaction in the unburnt mixture rapidly increases after the fuel injection. The extent of reaction in the unburnt mixture exceeds the threshold of ignition before the ignition. That is, preignition occurs. In order to reduce the preignition, as indicated by the void arrow in FIG. 10(c), the time of injecting fuel needs to be delayed, for example, to the expansion stroke after the compression top dead center to gradually increase the extent of reaction in the unburnt mixture (see the broken line in FIG. 10(c)).

In order to reduce knocking (i.e., end gas knock), there is a need to prevent the extent of reaction in the unburnt mixture from reaching the threshold of ignition until the combustion mass percentage becomes 90% (see the broken lines in FIGS. 10(b) and 10(c)). As described above, in the high pressure retarded injection, the temperature in the cylinder 18 is high, and thus knocking cannot be reduced unless the ignition time is retarded as indicated by the void arrow in FIG. 10(a). As indicated by the broken line in FIG. 10(a), this retarding of the ignition time spaces the center of gravity of combustion apart from the compression top dead center. This reduces the thermal efficiency and the torque, and eventually deteriorates the fuel efficiency. The ignition herein is the dual point ignition.

By contrast, the intake stroke injection performs the fuel injection in the intake stroke, which is not shown in FIG. 10. The air-fuel mixture with a relatively low specific heat ratio is compressed in the compression stroke (see the solid line in FIG. 10(e)). Thus, as indicated by the solid line in FIG. 10(d), a rise in the temperature of the unburnt mixture is reduced, thereby lowering the compression end temperature. This is thus advantageous in reducing the preignition.

The low compression end temperature is advantageous in reducing knocking. Knocking can be reduced without retarding the ignition time (see the solid lines in FIGS. 10(b) and 10(c)). As such, as indicated by the solid line in FIG. 10(a), the ignition time is as close as possible to the compression top dead center, thereby bringing the center of gravity of combustion closer to the compression top dead center. This is advantageous in improving the thermal efficiency and the torque, and eventually improving the fuel efficiency.

Figure 11:
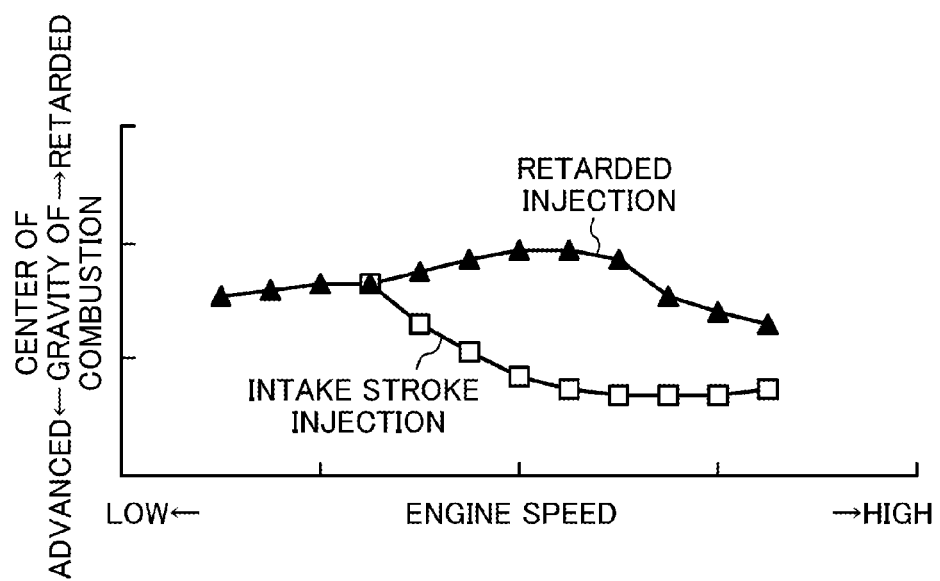
FIG. 11 illustrates example relation between the engine speed and the center of gravity of combustion in the intake stroke injection and in the retarded injection.

As described above, the high pressure retarded injection needs to delay the fuel injection time and the ignition time in a high speed range to reduce preignition and knocking. The retard amount increases with the increasing engine speed. As a result, as shown in FIG. 11, the relation between the engine speed and the center of gravity of combustion is described as follows. In the high pressure retarded injection, the center of gravity of combustion moves to a retarded angle with the increasing engine speed. As shown in FIG. 7, the high pressure retarded injection secures high indicated thermal efficiency in a low speed range where the engine speed is relatively low. On the other hand, the indicated thermal efficiency decreases in a high speed range where the engine speed is relatively high.

By contrast, the intake stroke injection is not executed in the low speed range where the engine speed is relatively low, since the reactive time of the unburnt mixture is long to cause the preignition. On the other hand, as shown in FIG. 11, in the high speed range where the engine speed is relatively high, the preignition and knocking are efficiently reduced to maintain the center of gravity of combustion retarded. As shown in FIG. 7, the intake stroke injection provides high indicated thermal efficiency in the high speed range where the engine speed is relatively high.

Therefore, this engine 1 performs the high pressure retarded injection in the range (1) shown in FIG. 4, that is, the high-load low-speed range, to reduce abnormal combustion and improve the thermal efficiency. On the other hand, the engine 1 performs the intake stroke injection in the range (2) shown in FIG. 4, that is in the high-load high-speed range, to reduce abnormal combustion and improve the thermal efficiency.

Figure 12:
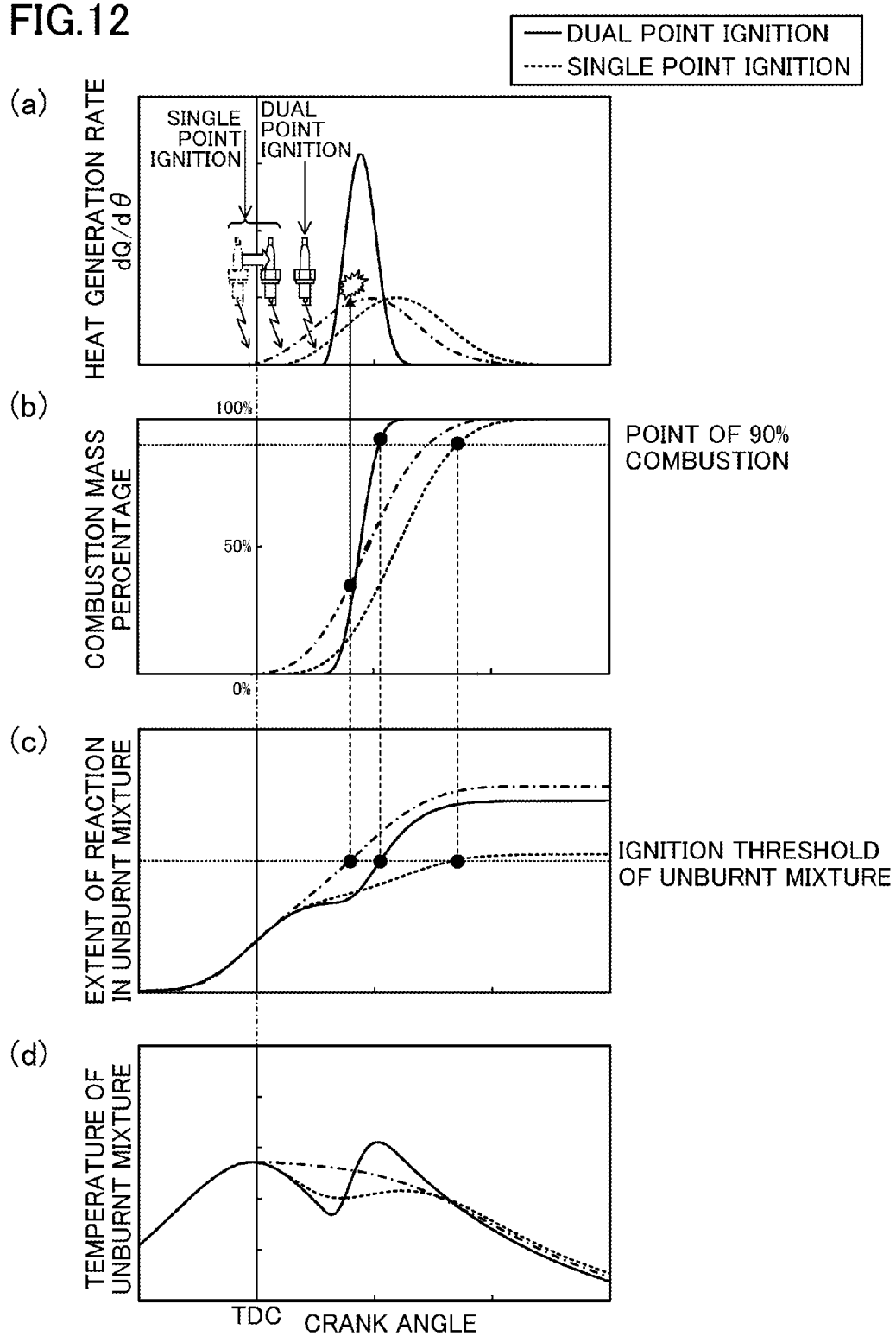
FIG. 12 illustrate the comparison between single point ignition and dual point ignition in the intake stroke injection in (a) the heat generation rate, (b) the combustion mass percentage, (c) the extent of reaction in the unburnt mixture, and (d) the temperature of the unburnt mixture.

As described above, in the high-load high-speed range of the engine 1, dual point ignition is executed together with the intake stroke injection. FIG. 12 illustrates the comparison between single point ignition and the dual point ignition based on the assumption that the intake stroke injection is performed where the engine is in a high-load high-speed range. FIG. 12 illustrate changes in (a) the heat generation rate, (b) the combustion mass percentage, (c) the extent of reaction in the unburnt mixture, and (d) the temperature of the unburnt mixture relative to the crank angle.

First, as indicated by the dashed lines in FIG. 12, assume that the single point ignition is performed at a time before the compression top dead center. In this case, flame propagates slowly, and thus the extent of reaction in the unburnt mixture exceeds the threshold of ignition until the combustion mass percentage reaches 90%, thereby causing knocking (see FIGS. 12(b) and 12(c)). Thus, in order to reduce knocking in the single point ignition, the ignition time needs to be retarded as indicated by the void arrow in FIG. 12(a). Accordingly, as indicated by the broken line, the center of gravity of combustion moves to a retarded position. That is, the single point ignition is disadvantageous in improving the thermal efficiency and the torque.

By contrast, the dual point ignition allows flame to propagate from a plurality of flash points in the combustion chamber 19, and thus the flame propagates rapidly to shorten the combustion period. Thus, in the dual point ignition, even if the ignition time is after the compression top dead center, as indicated by the solid line in FIG. 12(a), the center of gravity of combustion is in a position as advanced as possible. This is advantageous in improving the thermal efficiency and the torque, and eventually improving the fuel efficiency. The number of the spark plugs is not limited to two. Multi-point ignition may be performed in the high pressure retarded injection.

Figure 13:
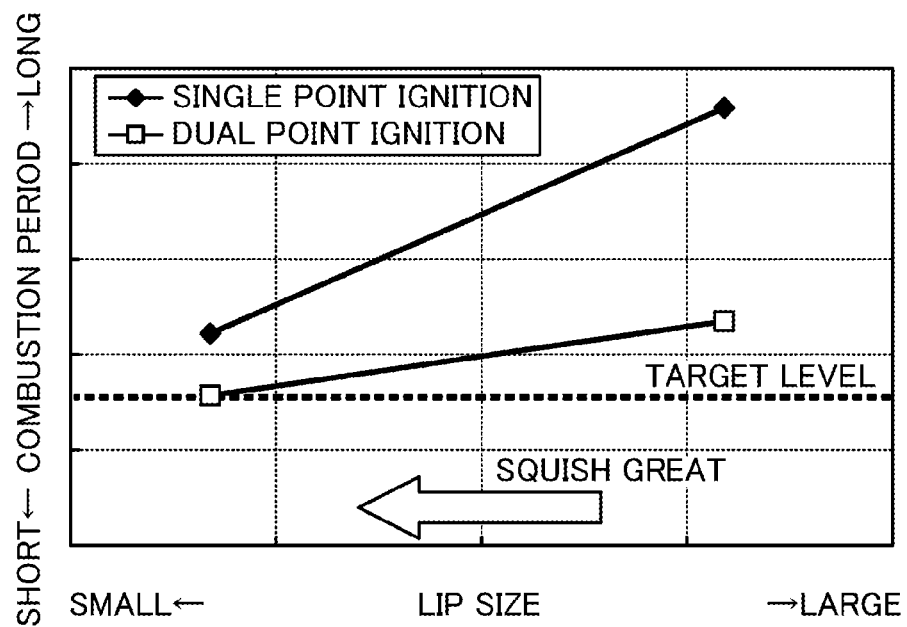
FIG. 13 illustrates example relation between a lip size of a cavity and a combustion period in the single point ignition and the dual point ignition.

FIG. 13 illustrates example relation between the lip size of the cavity 141 and the combustion period in the intake stroke injection. As shown in FIG. 3C, a decrease in the lip size increases the squish area (assume that the piston sizes are the same). This means that the squish increases with the decreasing distance to the left in FIG. 13. As clear from the graph, in the single point ignition as well as in the dual point ignition, a decrease in the lip size to increase the squish strengthens the flow in the cylinder 18 and shortens the combustion period. In particular, the combination between the dual point ignition and a small lip size shortens the combustion period to a target level. This is advantageous in reducing knocking, and in improving the thermal efficiency and the torque.

As described above, reducing the lip size is disadvantageous in allowing the cavity 141 to contain the fuel spray injected from the injector 67. The lip size can be reduced by setting the fuel injection angle θ of the injector 67 relatively small. Therefore, this configuration is more advantageous in shortening the combustion period by using the combination of a relatively small cavity and a great squish.

In the above-described configuration, only the intake stroke injection is performed in the high-load high-speed range. As indicated by the dashed line in FIG. 9(b), the fuel may be injected within a retarded period in addition to the intake stroke injection. As described above, the fuel injection in the retarded period strengthens the flow in the cylinder 18, which is advantageous in shortening the combustion period. Therefore, it is advantageous in reducing knocking.

This combination of the intake stroke injection and the retarded injection may be performed under the condition where the compression end temperature is equal to or lower than a predetermined temperature, specifically, where the outside temperature is equal to or lower than the predetermined temperature. The condition where the compression end temperature is equal to or lower than the predetermined temperature is actually advantageous in reducing abnormal combustion. Thus, even if the amount of the fuel injected in the intake stroke is reduced, abnormal combustion can be reduced. The reduced amount of the fuel is injected in the retarded period, which is advantageous in shortening the combustion period.

In the above-described configuration, the fuel injection time is switched between the low speed range and the high speed range in the high load SI mode. In the SI mode, the preceding injection during the intake stroke and the succeeding injection in the retarded period may be both performed. In the low speed range, the amount of the fuel injected in the succeeding injection may be larger than the amount of the fuel injected in preceding injection. On the other hand, in the high speed range, the amount of the fuel injected in preceding injection may be larger than the amount of the fuel injected in the succeeding injection. In this case as well, similar to the above-described control, abnormal combustion is reduced in the high-load low-speed range, and the high-load high-speed range. This is advantageous in improving the thermal efficiency and the torque, and eventually improving the fuel efficiency.

The fuel may be injected in the intake stroke not by the injector 67 provided in the cylinder 18. The fuel may be injected into the intake port 16 through an extra port injector provided in the intake port 16.

The present disclosure is applicable not only to the above-described naturally aspirated engine, but to a turbocharged engine. The turbocharged engine expands the range of the CI mode to a high load range.

The high pressure retarded injection may be split injection as necessary. Similarly, the intake stroke injection may be split injection as necessary.

In addition, in the above-described configuration, where the operating mode of the engine 1 is in the low load range within the low speed range, the CI mode is used to perform the compression ignition combustion. Instead, where the operating mode of the engine 1 is in the low load range within the low speed range, the operating mode is used to perform spark ignition and combustion of a stratified lean mixture.

Description of Reference Characters
1 Engine (Engine Body)
10 PCM (Controller)
18 Cylinder
21 Intake Valve
25 First Spark Plug
26 Second Spark Plug
50 EGR Passage (Cooling EGR Section)
511 EGR Valve (Cooling EGR Section)
52 EGR Cooler (Cooling EGR Section)
62 Fuel Supply System (Fuel Pressure Variable Mechanism)
67 Injector (Fuel Injection Valve)

The invention claimed is:

1. A control system of a spark ignition gasoline engine, the system comprising:
an engine body including a cylinder with a geometrical compression ratio of 15 or higher, and supplied with fuel containing at least gasoline;
a fuel injection valve configured to inject the fuel supplied to the cylinder; and
a controller configured to operate the engine body by controlling at least the fuel injection valve, wherein
when an operating mode of the engine body is in a high load range, the controller
drives the fuel injection valve to inject the fuel at a time within a retarded period between a terminal stage of a compression stroke and an initial stage of an expansion stroke in a low speed range, and
drives the fuel injection valve to inject the fuel in an intake stroke until an intake valve is closed in a high speed range.

2. The control system of claim 1, further comprising:
a plurality of spark plugs disposed to face an inside of the cylinder, and configured to ignite an air-fuel mixture in the cylinder, wherein
when the operating mode of the engine body is in the high-load high-speed range, the controller executes multi-point ignition driving the plurality of spark plugs.

3. The control system of claim 1, further comprising:
the fuel injection valve configured to directly inject the fuel into the cylinder; and
a fuel pressure variable mechanism configured to change pressure of the fuel injected by the fuel injection valve, wherein
when the operating mode of the engine body is in the high-load low-speed range, the controller drives the fuel pressure variable mechanism such that the pressure of the fuel is equal to or higher than a predetermined value, and when the operating mode of the engine body is in the high-load high-speed range, the controller drives the fuel pressure variable mechanism such that the pressure of the fuel is lower than the predetermined value.

4. The control system of claim 1, wherein
when the operating mode of the engine body is in the high-load high-speed range, the controller executes fuel injection at the time within the retarded period, in addition to the fuel injection in the intake stroke, and sets an amount of the fuel injected in the retarded period smaller than the amount of the fuel injected in the intake stroke.

5. The control system of claim 4, wherein
the controller executes both of the fuel injection in the intake stroke and the fuel injection in the retarded period under a condition where a compression end temperature in the cylinder is equal to or lower than a predetermined temperature.

6. The control system of claim 1, further comprising:
a cooling EGR section configured to cool exhaust gas of the engine body, and then to recirculate the cooled exhaust gas into an intake air of the engine body, wherein when the operating mode of the engine body is in the high-load high-speed range, the controller recirculates the cooled exhaust gas via the cooling EGR section.

7. A control system of a spark ignition gasoline engine, the system comprising:
an engine body including a cylinder with a geometrical compression ratio of 15 or higher, and supplied with fuel containing at least gasoline;
a fuel injection valve configured to inject the fuel supplied to the cylinder; and
a controller configured to operate the engine body by controlling at least the fuel injection valve, wherein
when an operating mode of the engine body is in a high load range, the controller drives the fuel injection valve to include preceding injection injecting the fuel in an intake stroke until an intake valve is closed, and succeeding injection injecting the fuel at a time between a terminal stage of a compression stroke and an initial stage of an expansion stroke, and
the controller sets an amount of the fuel injected in the succeeding injection larger than the amount of the fuel injected in the preceding injection in a low speed range of the high load range, and sets the amount of the fuel injected in the preceding injection larger than the amount of the fuel injected in the succeeding injection in a high speed range of the high load range.

8. A control method of a spark ignition gasoline engine, the engine including a cylinder with a geometrical compression ratio of 15 or higher, and supplied with fuel containing at least gasoline, the method comprising:
performing fuel injection into the cylinder at a time within a retarded period between a terminal stage of a compression stroke and an initial stage of an expansion stroke when an operating mode of the spark ignition gasoline engine is in a high-load low-speed range; and
performing the fuel injection into the cylinder in an intake stroke until an intake valve is closed when the operating mode of the spark ignition gasoline engine is in a high-load high-speed range.

9. A control method of a spark ignition gasoline engine, the engine including a cylinder with a geometrical compression ratio of 15 or higher, and supplied with fuel containing at least gasoline, the method comprising:
performing at least preceding injection injecting the fuel into the cylinder in an intake stroke until an intake valve is closed, and succeeding injection injecting the fuel into the cylinder at a time between a terminal stage of a compression stroke and an initial stage of an expansion stroke when an operating mode of the spark ignition gasoline engine is in a high load range; and
setting an amount of the fuel injected in the succeeding injection larger than the amount of the fuel injected in the preceding injection when the operating mode of the spark ignition gasoline engine is in a low speed range of the high load range, and
setting the amount of the fuel injected in the preceding injection larger than the amount of the fuel injected in the succeeding injection when the operating mode of the spark ignition gasoline engine is in a high speed range of the high load range.

* * * * *